(12) United States Patent
Lee et al.

(10) Patent No.: US 12,458,068 B2
(45) Date of Patent: Nov. 4, 2025

(54) AEROSOL-GENERATING DEVICE

(71) Applicant: KT&G CORPORATION, Daejeon (KR)

(72) Inventors: Jongsub Lee, Sungnam-si (KR); Minkyu Kim, Seoul (KR); Jueon Park, Seoul (KR); Byungsung Cho, Gwangmyung-si (KR); Sungrok Oh, Gunpo-si (KR)

(73) Assignee: KT&G CORPORATION, Daejeon (KR)

( * ) Notice: Subject to any disclaimer, the term of this patent is extended or adjusted under 35 U.S.C. 154(b) by 623 days.

(21) Appl. No.: 17/796,069

(22) PCT Filed: Nov. 22, 2021

(86) PCT No.: PCT/KR2021/017182
§ 371 (c)(1),
(2) Date: Jul. 28, 2022

(87) PCT Pub. No.: WO2022/114703
PCT Pub. Date: Jun. 2, 2022

(65) Prior Publication Data
US 2023/0076280 A1    Mar. 9, 2023

(30) Foreign Application Priority Data
Nov. 24, 2020  (KR) ........................ 10-2020-0159117

(51) Int. Cl.
*A24F 40/42*  (2020.01)
*A24F 40/10*  (2020.01)
(Continued)

(52) U.S. Cl.
CPC .............. *A24F 40/42* (2020.01); *A24F 40/10* (2020.01); *A24F 40/20* (2020.01); *A24F 40/30* (2020.01); *A24F 40/60* (2020.01)

(58) Field of Classification Search
None
See application file for complete search history.

(56) References Cited

U.S. PATENT DOCUMENTS

2019/0289909 A1   9/2019  Hejazi
2019/0307168 A1   10/2019 Zhao et al.
2019/0307173 A1   10/2019 Qiu

FOREIGN PATENT DOCUMENTS

CA     3139698 A1 * 11/2021  ............. A24F 40/10
CN     1915124       2/2007
(Continued)

OTHER PUBLICATIONS

PCT International Application No. PCT/KR2021/017182, International Search Report dated Mar. 2, 2022, 2 pages.
(Continued)

*Primary Examiner* — Linda L Gray
(74) *Attorney, Agent, or Firm* — LEE, HONG, DEGERMAN, KANG & WAIMEY

(57) ABSTRACT

An aerosol-generating device is disclosed. The aerosol-generating device includes a housing; a cartridge disposed in the housing and including a first container and a second container which are rotatably coupled, wherein the second container includes a plurality of chambers which are isolated from each other; a dial gear disposed in the housing and configured to rotate about a rotating shaft parallel to a rotating shaft of the second container; and a cartridge gear coupled to the second container and engaged with the dial gear such that rotation of the dial gear causes rotation of the second container via the cartridge gear.

15 Claims, 18 Drawing Sheets

(51) Int. Cl.
*A24F 40/20* (2020.01)
*A24F 40/30* (2020.01)
*A24F 40/60* (2020.01)

(56) References Cited

FOREIGN PATENT DOCUMENTS

| | | |
|---|---|---|
| CN | 106231929 | 12/2016 |
| CN | 107373778 | 11/2017 |
| CN | 207040886 | 2/2018 |
| CN | 209403582 | 9/2019 |
| CN | 209768992 | 12/2019 |
| CN | 111329110 | 6/2020 |
| CN | 211581558 | 9/2020 |
| KR | 20-2019-0001863 | 7/2019 |
| KR | 10-2020-0007475 | 1/2020 |
| KR | 10-2020-0130442 | 11/2020 |
| WO | 2015013329 | 1/2015 |
| WO | WO-2020089890 A1 * | 5/2020 ............. A24F 40/30 |
| WO | 2020223875 | 11/2020 |
| WO | 2021241932 | 12/2021 |
| WO | 2021261786 | 12/2021 |
| WO | 2022010224 | 1/2022 |
| WO | 2022050677 | 3/2022 |
| WO | 2022065677 | 3/2022 |

OTHER PUBLICATIONS

European Patent Office Application Serial No. 21898529.9, Search Report dated Nov. 15, 2024, 10 pages.
Korean Intellectual Property Office Application No. 10-2020-0159117, Notice of Allowance dated Nov. 22, 2022, 2 pages.
State Intellectual Property Office of the People's Republic of China Application Serial No. 202180011871.1, Office Action dated Jun. 28, 2024, 10 pages.

* cited by examiner

[FIG. 1]
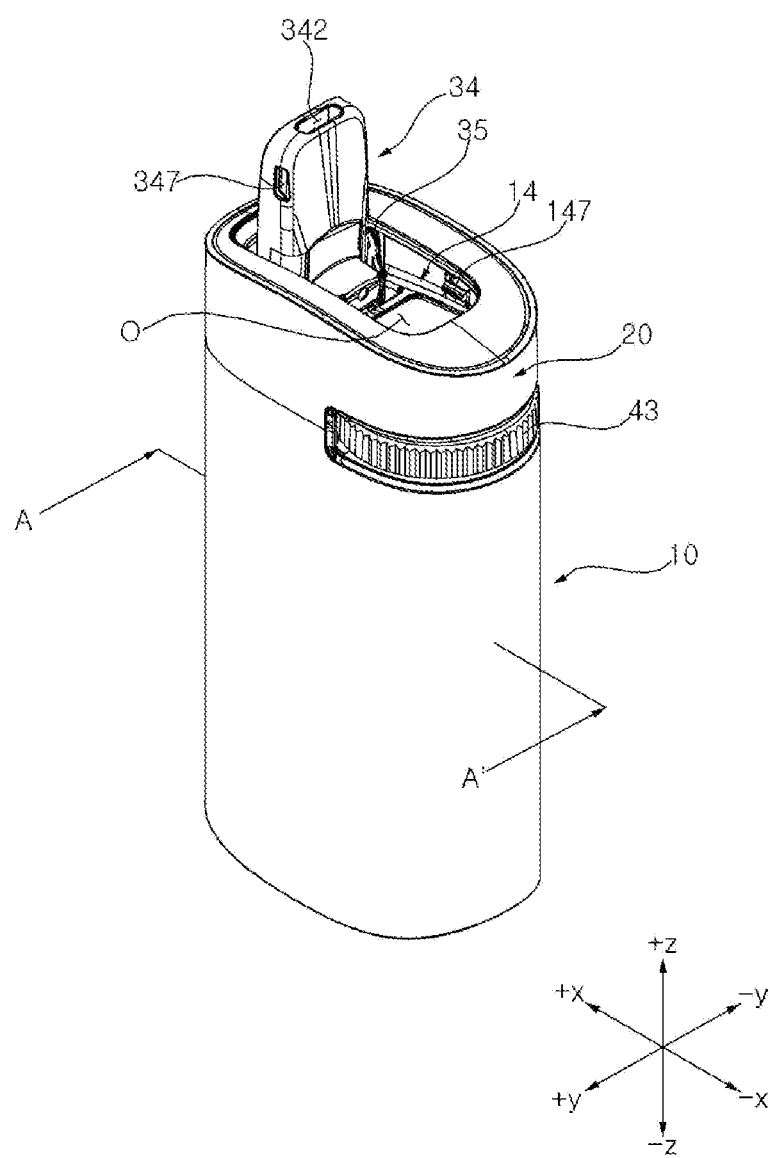

[FIG. 2]
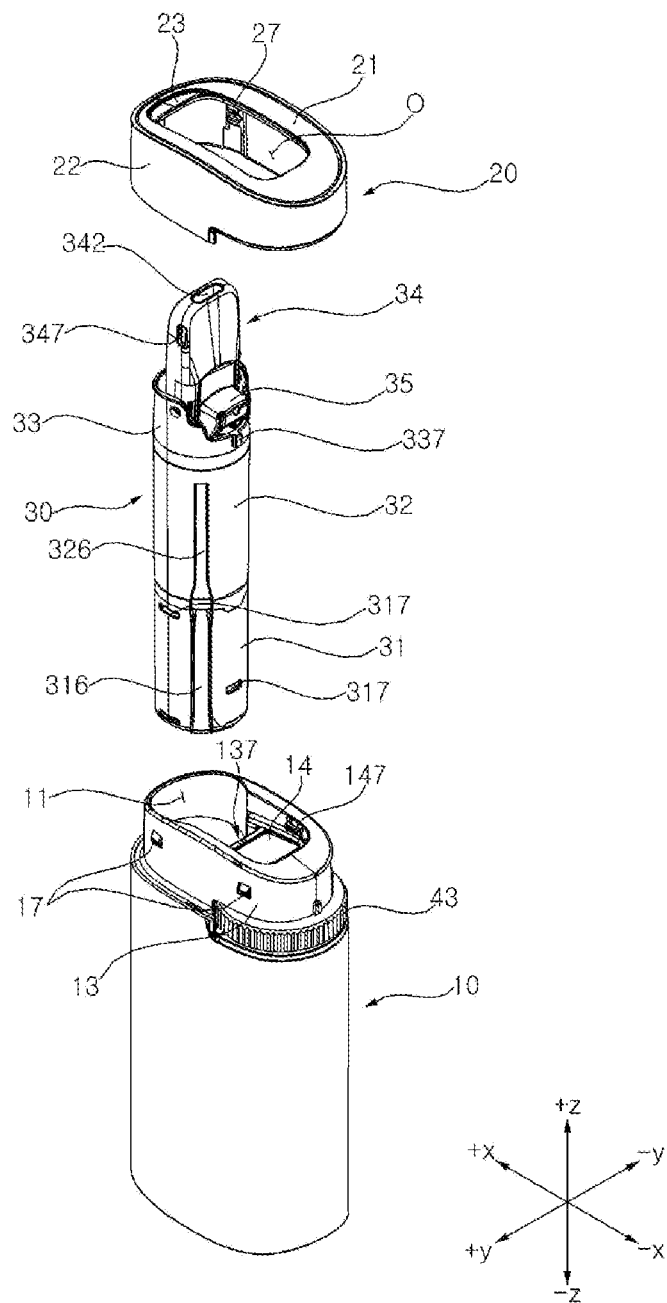

[FIG. 3]
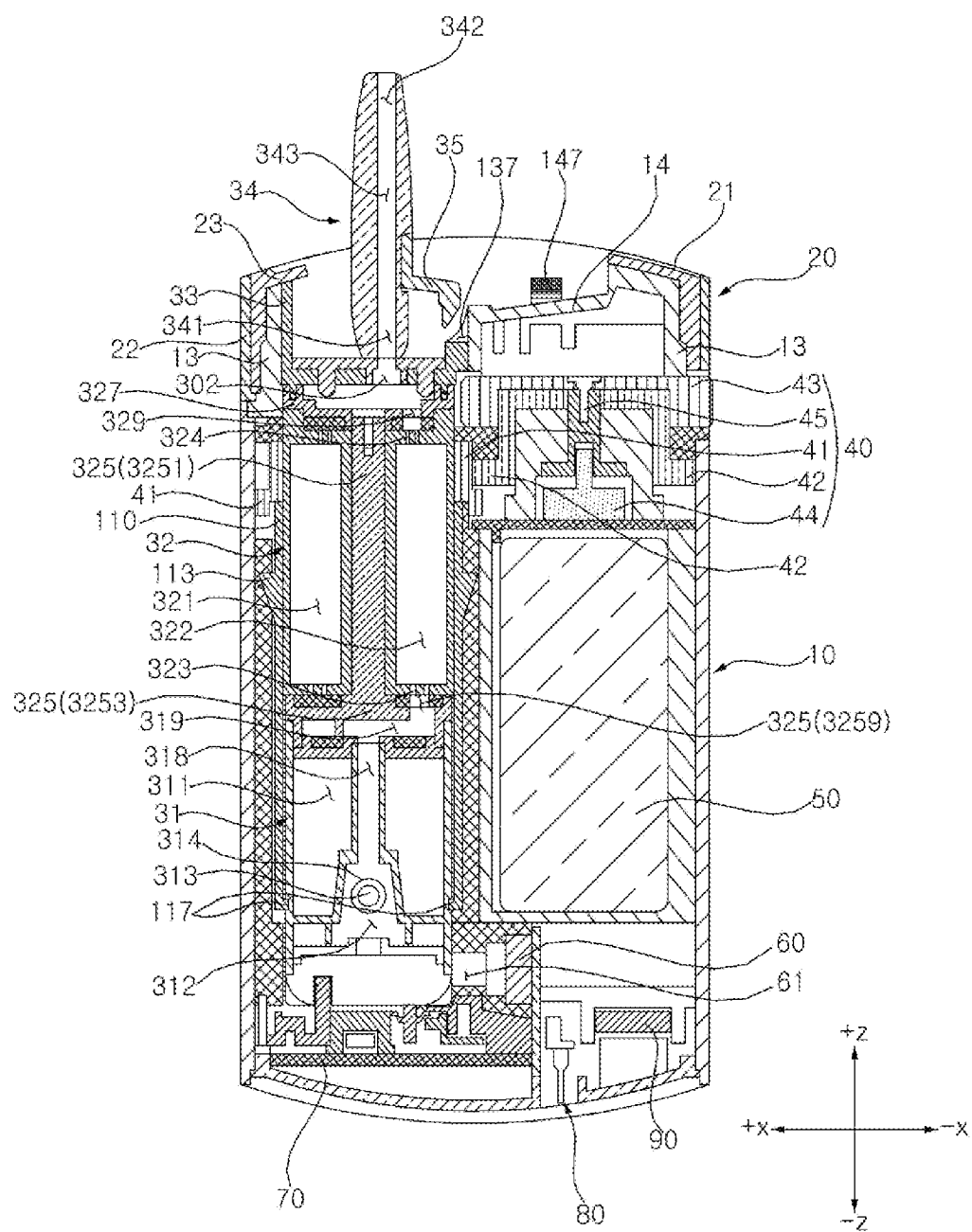

[FIG. 4]
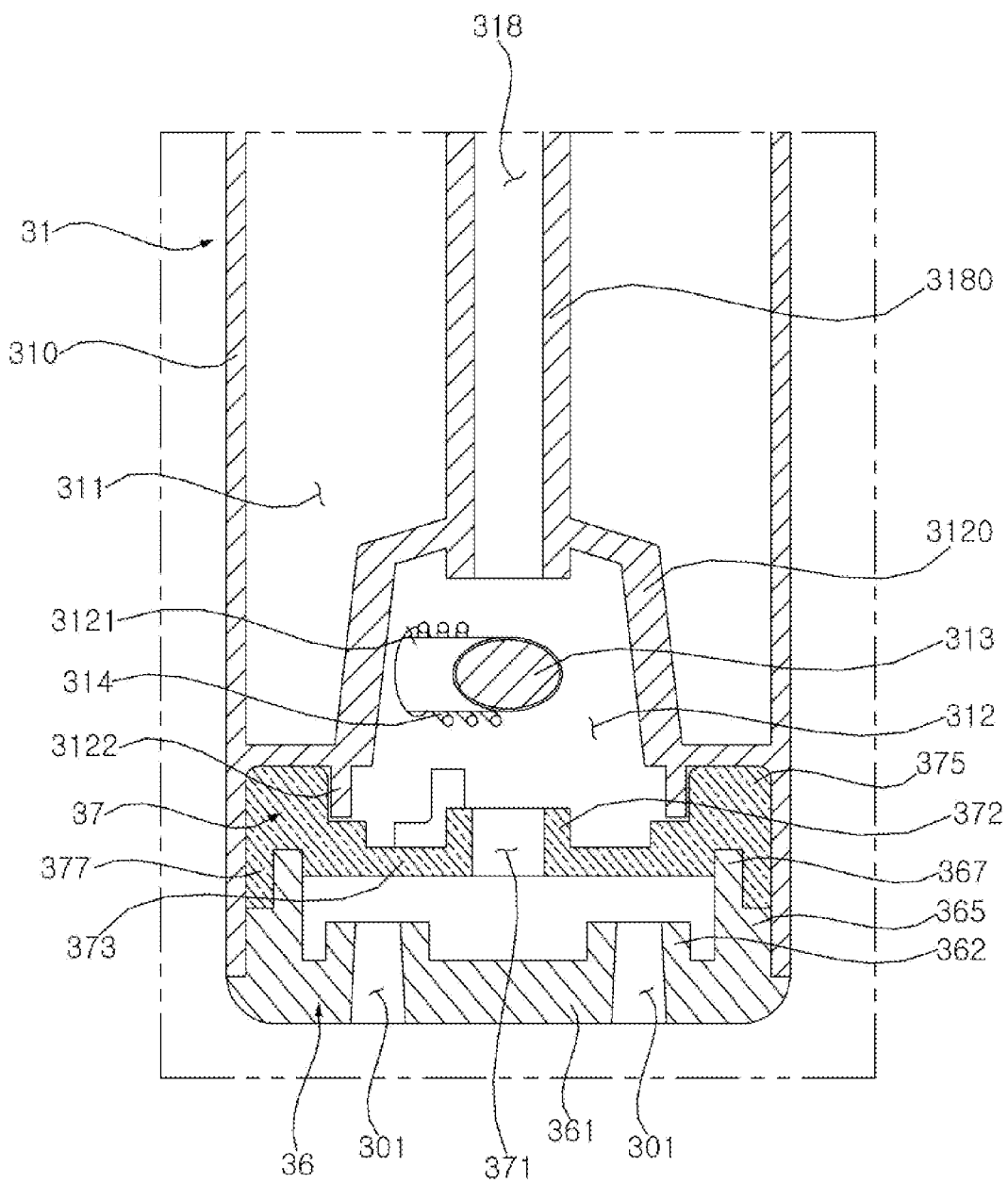

[FIG. 5]
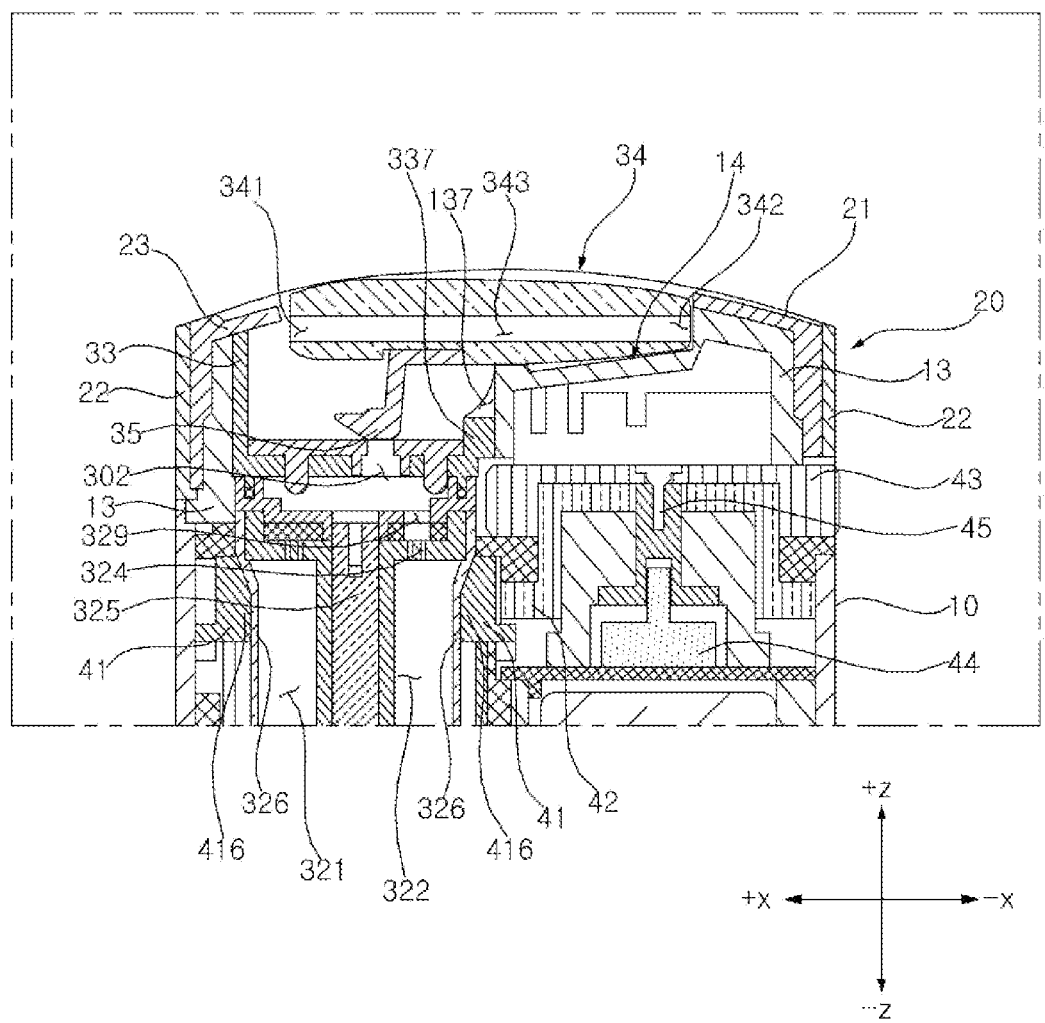

[FIG. 6]
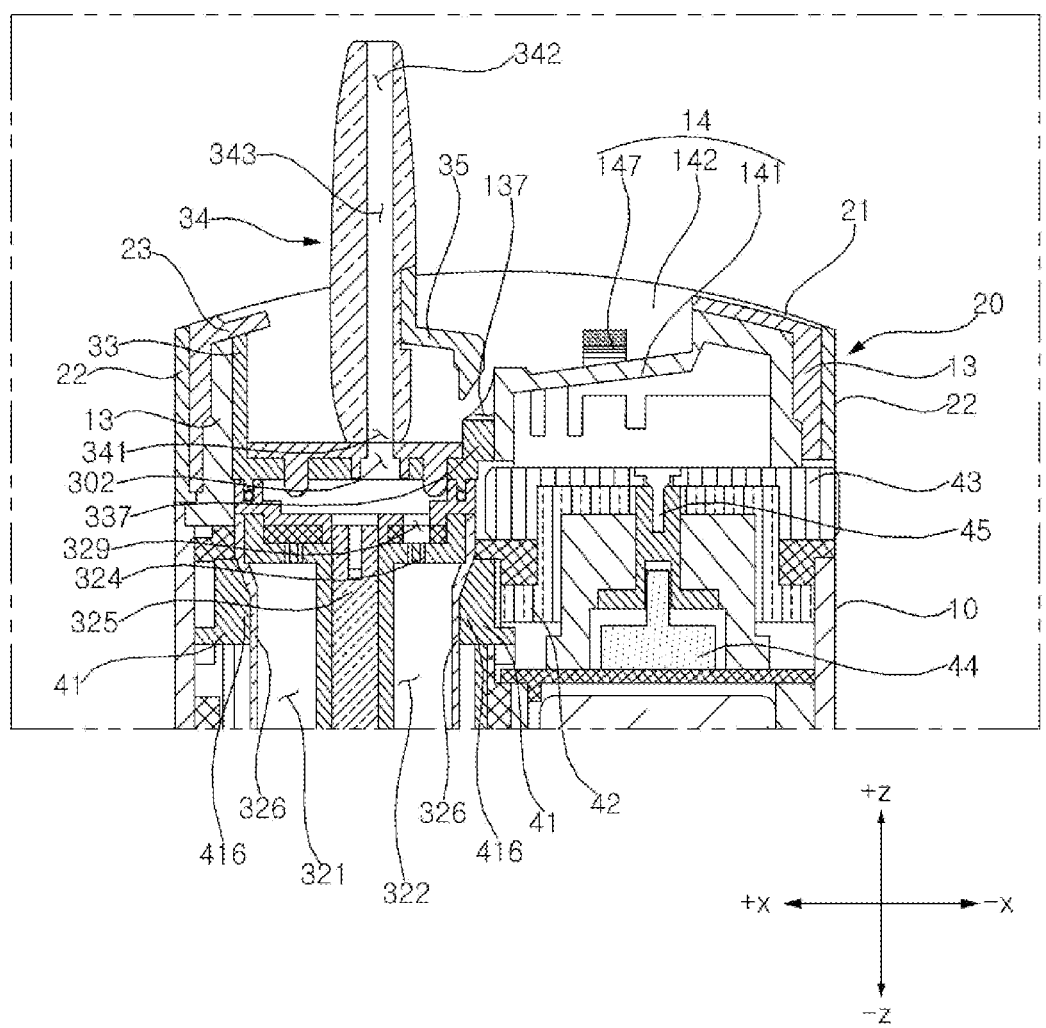

【FIG. 7】
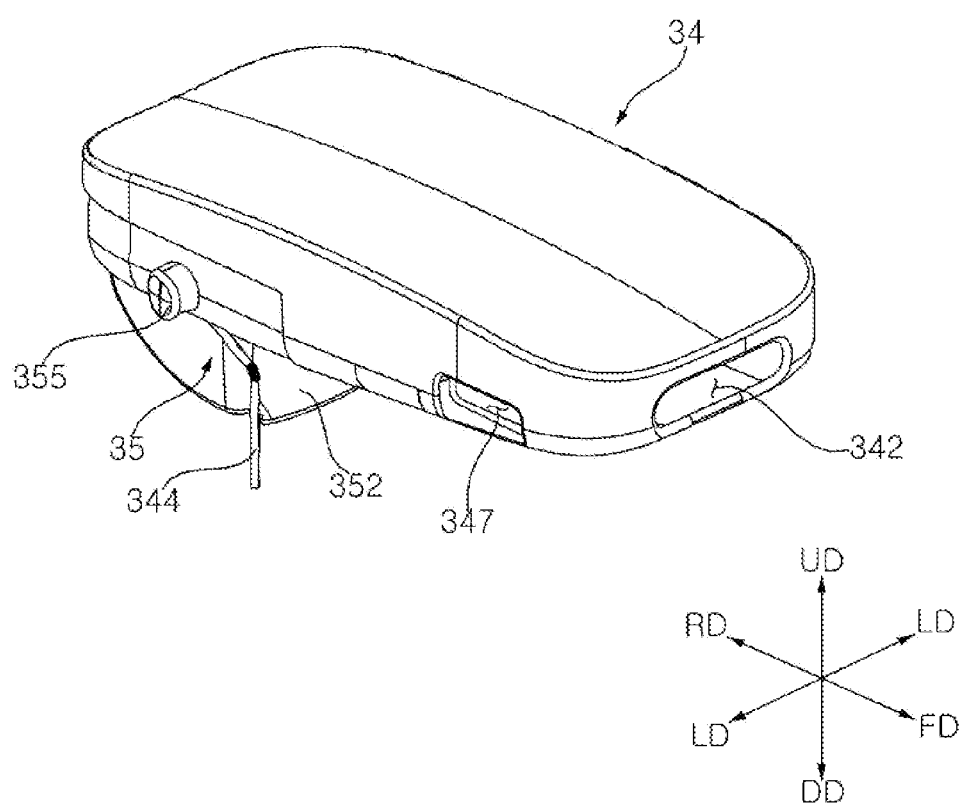

[FIG. 8]
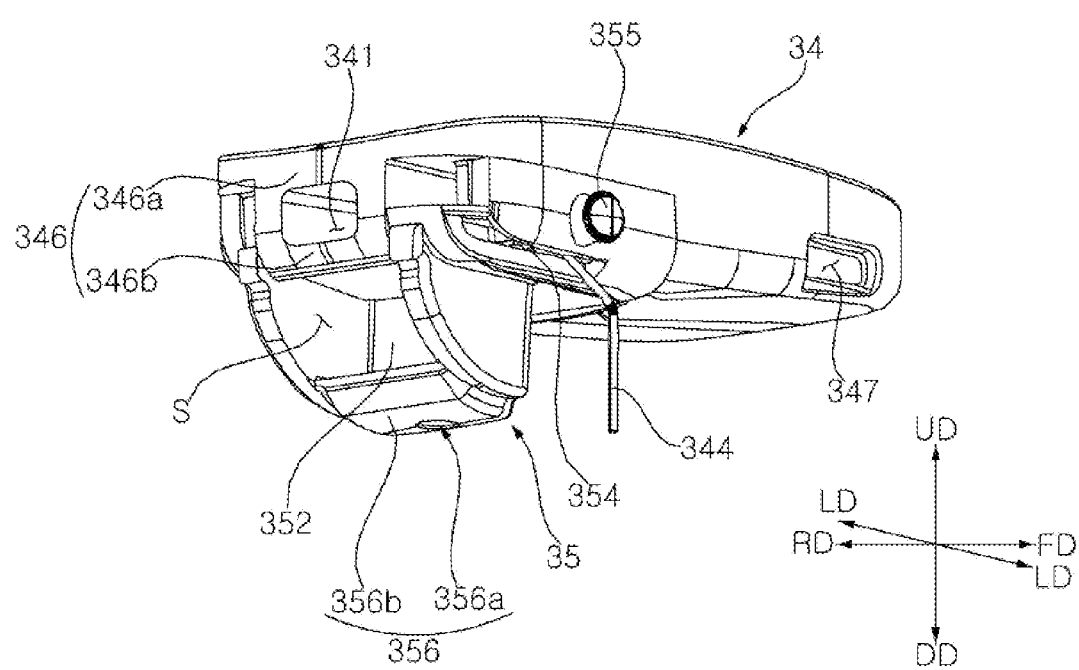

[FIG. 9]
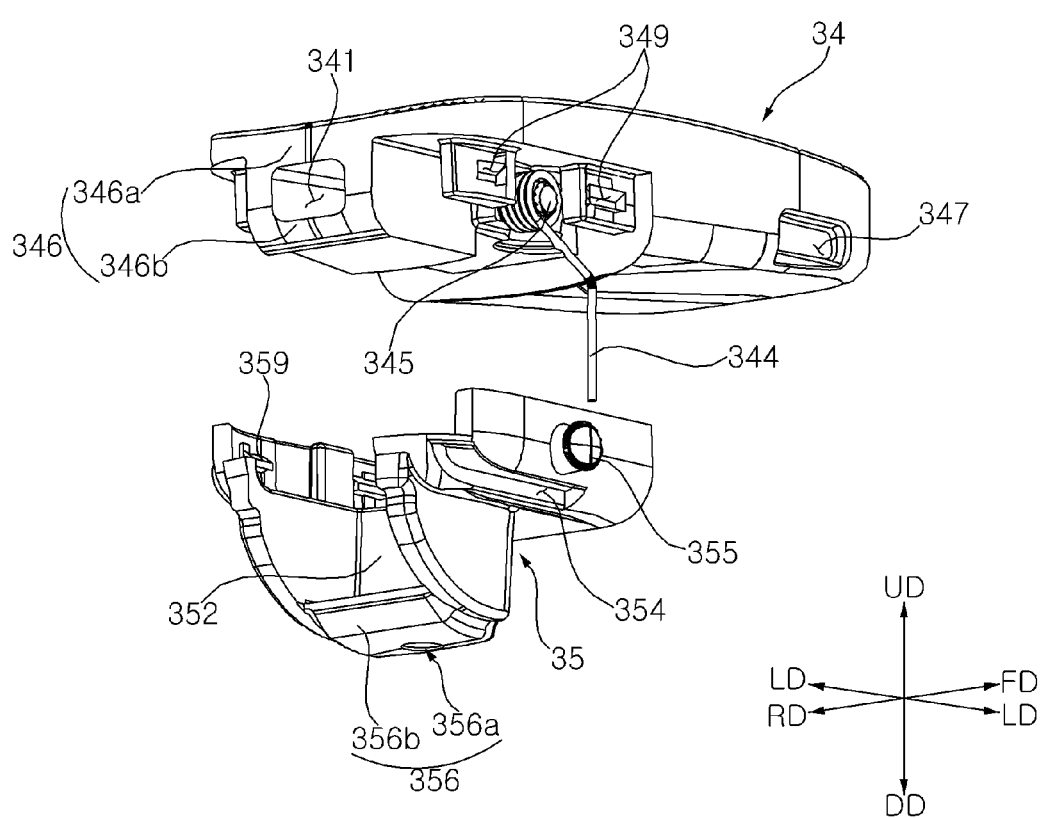

【FIG. 10】
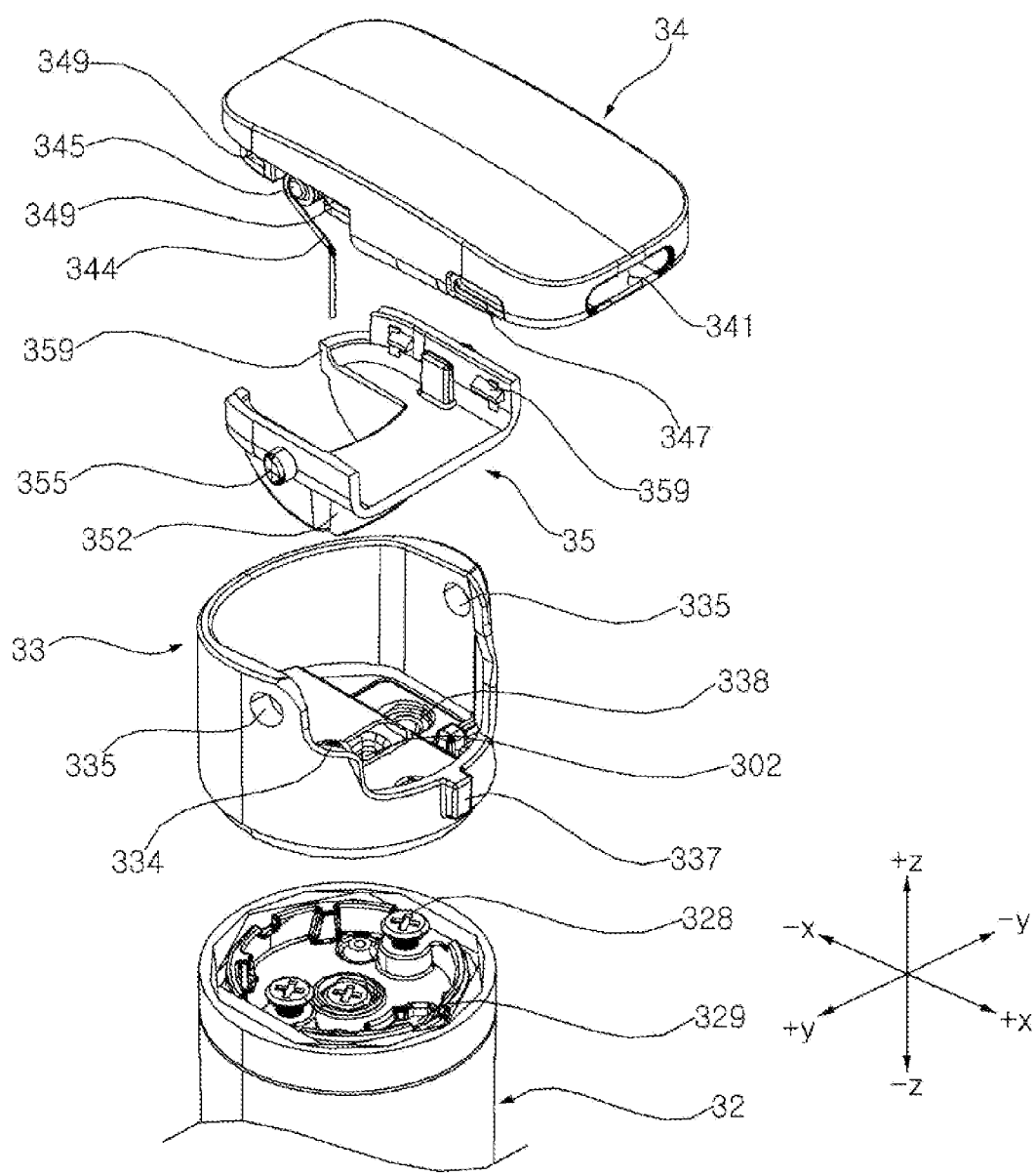

【FIG. 11】
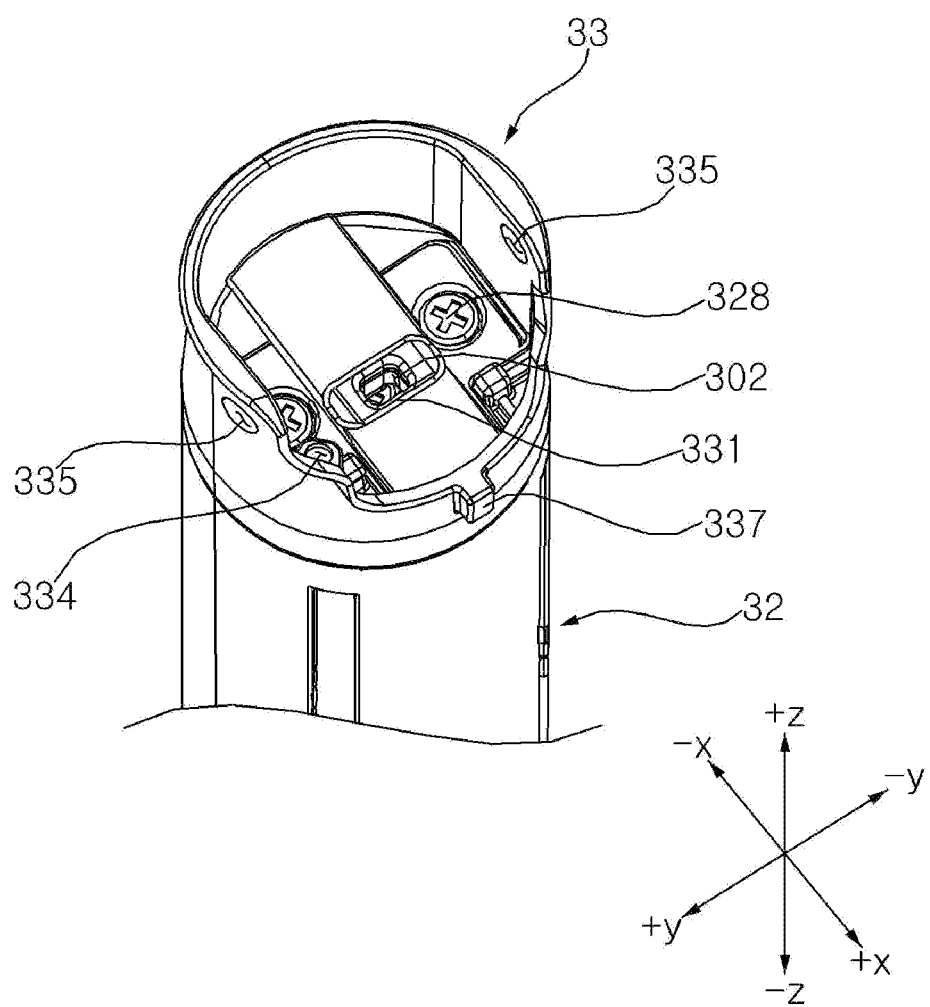

【FIG. 12】
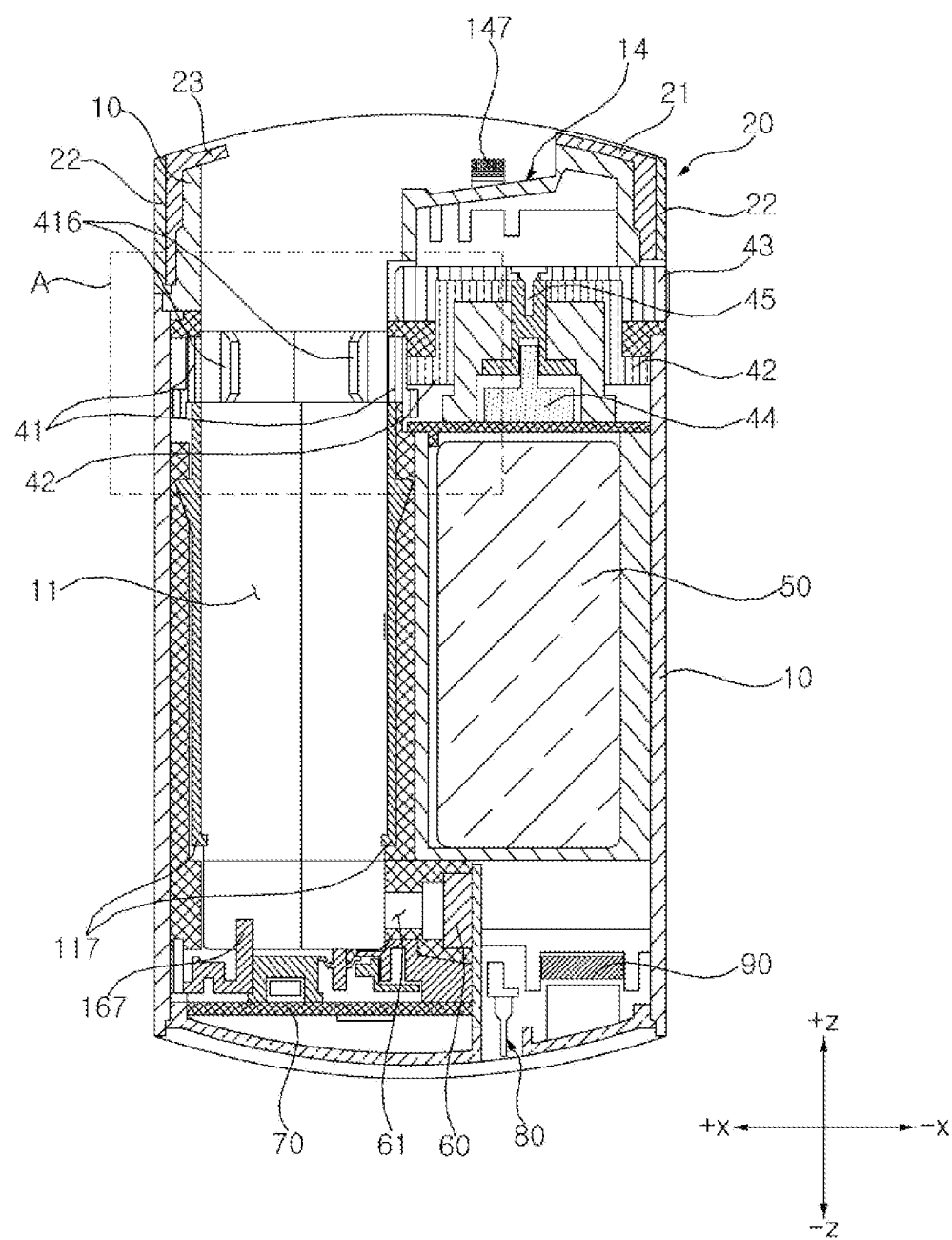

[FIG. 13]
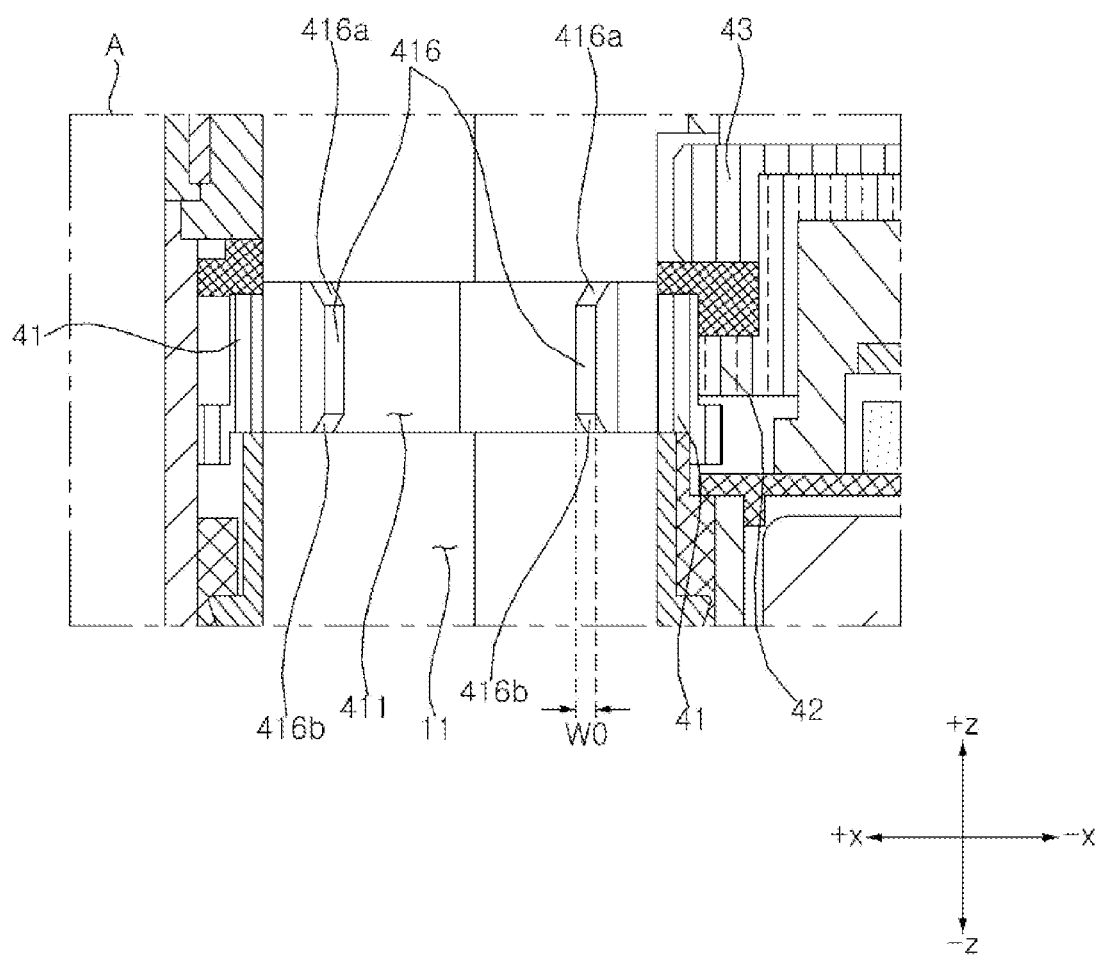

[FIG. 14]
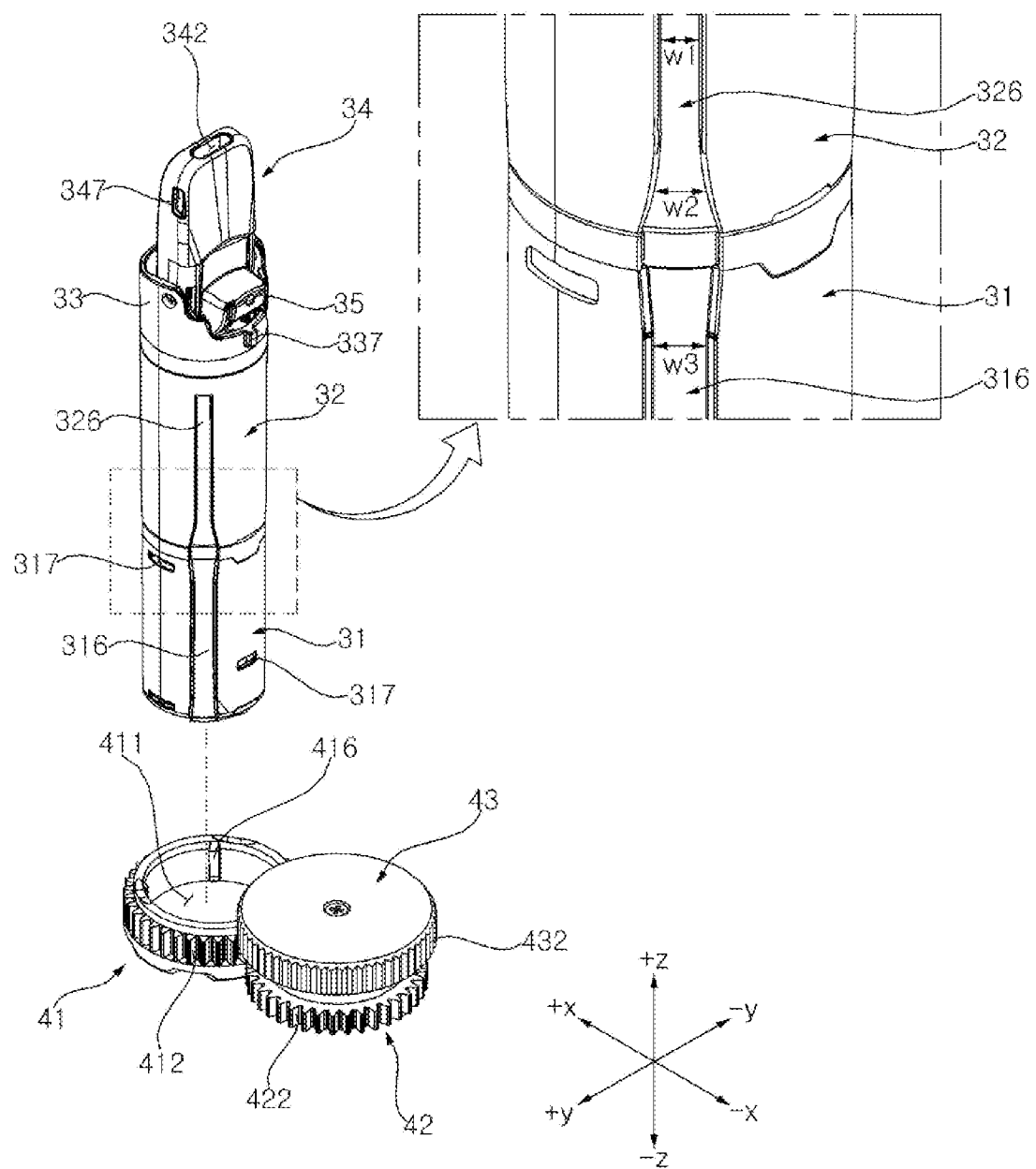

[FIG. 15]
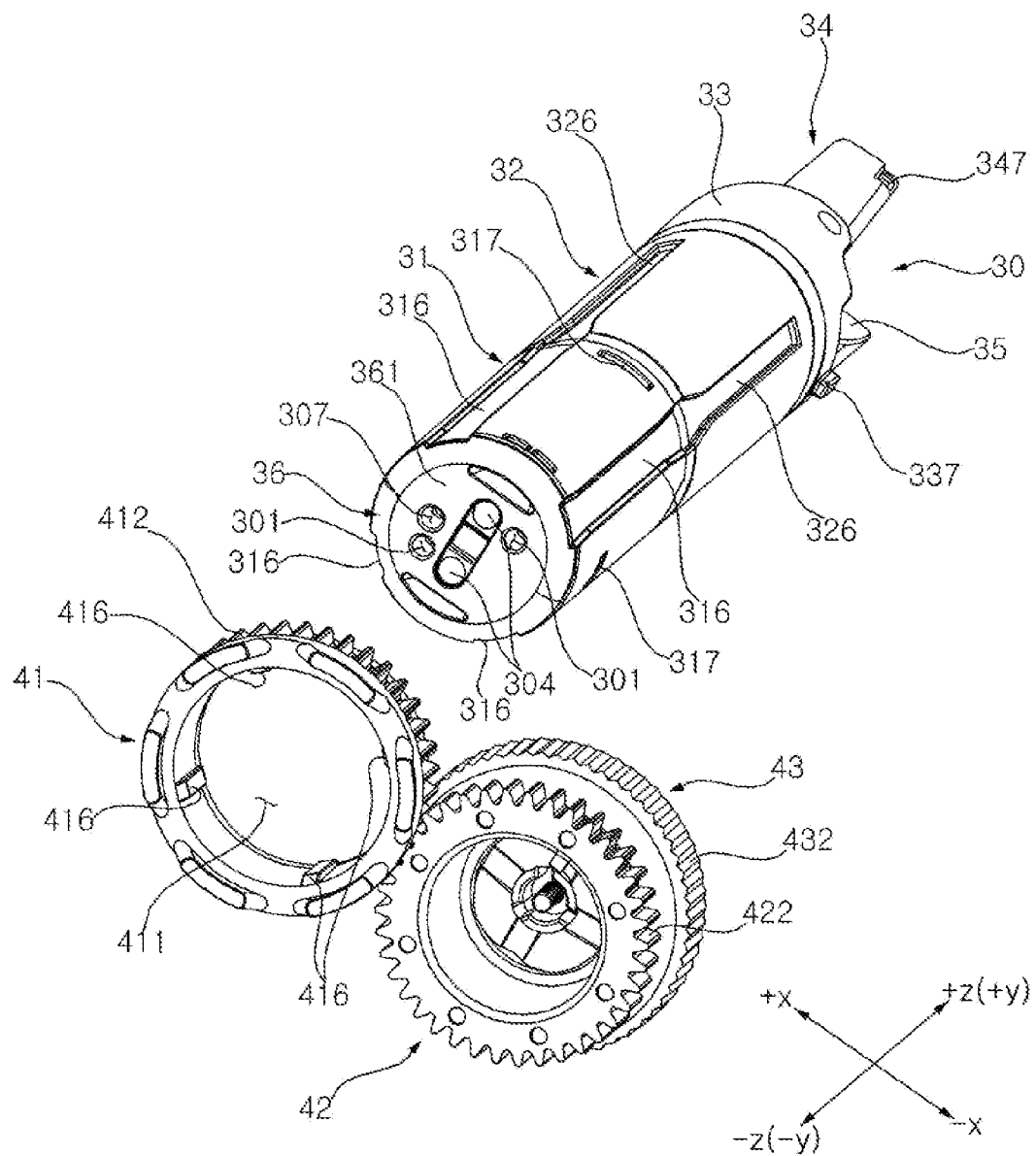

[FIG. 16]
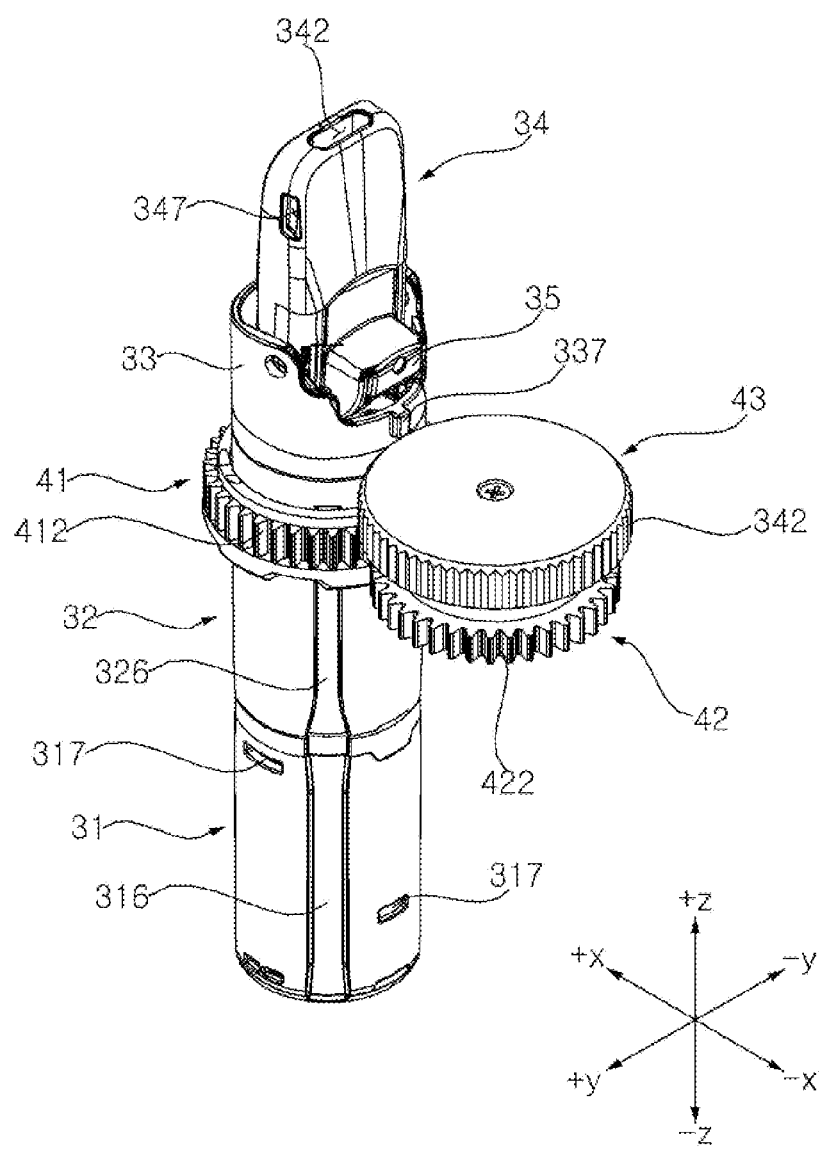

[FIG. 17]
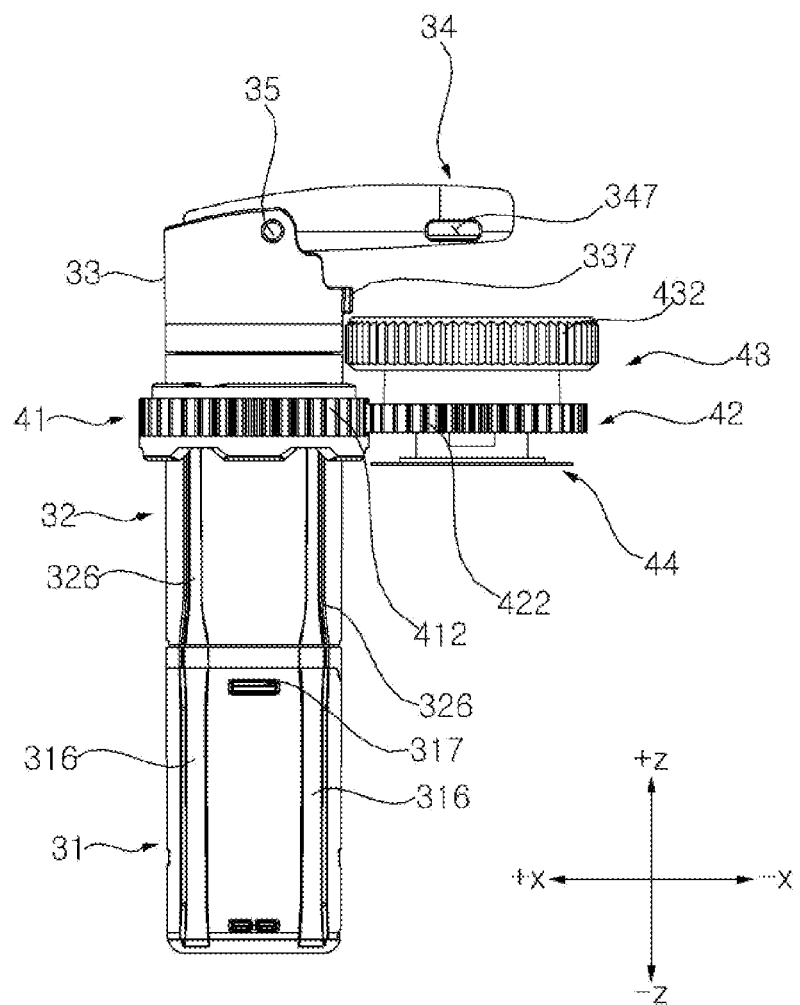

[FIG. 18]
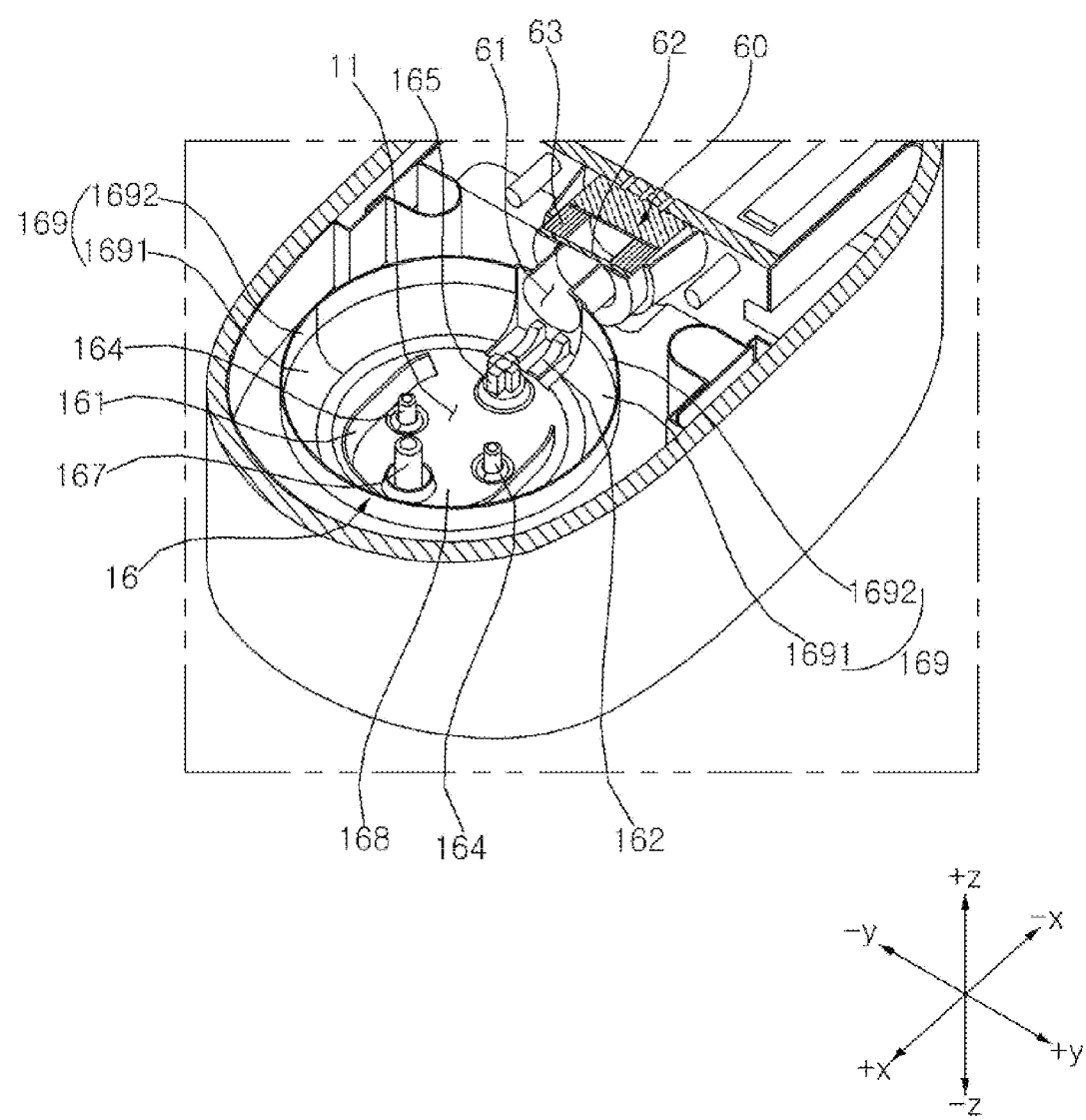

AEROSOL-GENERATING DEVICE

CROSS-REFERENCE TO RELATED APPLICATIONS

This application is the National Stage filing under 35 U.S.C. 371 of International Application No. PCT/KR2021/017182, filed on Nov. 22, 2021, which claims the benefit of earlier filing date and right of priority to Korean Application No. 10-2020-0159117, filed on Nov. 24, 2020, the contents of which are all hereby incorporated by reference herein their entirety.

TECHNICAL FIELD

The present disclosure relates to an aerosol-generating device.

BACKGROUND ART

An aerosol-generating device is a device that extracts certain components from a medium or a substance by forming an aerosol. The medium may contain a multicomponent substance. The substance contained in the medium may be a multicomponent flavoring substance. For example, the substance contained in the medium may include a nicotine component, an herbal component, and/or a coffee component. Recently, various research on aerosol-generating devices has been conducted.

DISCLOSURE OF INVENTION

Technical Problem

It is an object of the present disclosure to provide an aerosol-generating device capable of providing a user with a medium, optimal quality of which is maintained without reduction of service life due to prolonged use or decomposition due to exposure to external air, without having to replace a cartridge.

It is another object of the present disclosure to provide an aerosol-generating device capable of providing a user with a different medium depending on user's preference without having to replace a cartridge.

It is still another object of the present disclosure to provide an aerosol-generating device enabling the medium replacement period to be increased.

It is yet another object of the present disclosure to provide an aerosol-generating device capable of preventing decomposition of unused medium.

Solution to Problem

In accordance with an aspect of the present invention for accomplishing the above and other objects, there is provided a housing; a cartridge disposed in the housing and including a first container and a second container which are rotatably coupled, wherein the second container includes a plurality of chambers which are isolated from each other; a dial gear disposed in the housing and configured to rotate about a rotating shaft parallel to a rotating shaft of the second container; and a cartridge gear coupled to the second container and engaged with the dial gear such that rotation of the dial gear causes rotation of the second container via the cartridge gear.

Advantageous Effects of Invention

According to at least one of embodiments of the present disclosure, the aerosol-generating device is capable of providing a user with a medium, optimal quality of which is maintained without reduction of service life due to prolonged use or decomposition due to exposure to external air, without having to replace a cartridge.

In addition, according to at least one of embodiments of the present disclosure, the aerosol-generating device is capable of providing a user with a different medium as desired by the user without having to replace a cartridge.

In addition, according to at least one of embodiments of the present disclosure, the aerosol-generating device enables the medium replacement period to be increased.

In addition, according to at least one of embodiments of the present disclosure, the aerosol-generating device is capable of preventing decomposition of unused medium.

Additional applications of the present disclosure will become apparent from the following detailed description. However, because various changes and modifications that fall within the spirit and scope of the present disclosure will be readily apparent to those skilled in the art, it should be understood that the detailed description and specific embodiments, including preferred embodiments of the present disclosure, are merely given by way of example.

BRIEF DESCRIPTION OF DRAWINGS

The above and other objects, features and other advantages of the present disclosure will be more clearly understood from the following detailed description taken in conjunction with the accompanying drawings, in which:

FIGS. 1 to 18 are views illustrating an aerosol-generating device according to an embodiment of the present disclosure.

MODE FOR THE INVENTION

A description will now be given in detail according to exemplary embodiments disclosed herein, with reference to the accompanying drawings. For the sake of brevity of description with reference to the drawings, the same or equivalent components are denoted by the same reference numbers, and a description thereof will not be repeated.

In general, suffixes such as "module" and "unit" may be used to refer to elements or components. The use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to facilitate understanding of various technical features, and it should be understood that the embodiments presented herein are not limited by the accompanying drawings. As such, the present disclosure should be construed to extend to any alterations, equivalents and substitutes, in addition to those that are particularly set out in the accompanying drawings.

It is to be understood that, although the terms "first," "second," etc. may be used herein to describe various elements, these elements should not be limited by these terms. These terms are only used to distinguish one element from another.

It will be understood that when an element is referred to as being "connected with" another element, intervening elements may be present. In contrast, it will be understood that when an element is referred to as being "directly connected with" another element, there are no intervening elements present.

A singular representation may include a plural representation unless the context clearly indicates otherwise.

Hereinafter, directions of an aerosol-generating device are defined based on the orthogonal coordinate system shown in FIGS. 1 to 3, 5 and 6. In the orthogonal coordinate system, the x-axis direction may be defined as the rightward and leftward direction of the aerosol-generating device. Here, based on the origin, the +x-axis direction may mean the leftward direction, and the −x-axis direction may mean the rightward direction. Furthermore, the y-axis direction may be defined as the forward and backward direction of the aerosol-generating device. Here, based on the origin, the +y-axis direction may mean the forward direction, and the −y-axis direction may mean the backward direction. In addition, the z-axis direction may be defined as the upward and downward direction of the aerosol-generating device. Here, based on the origin, the +z-axis direction may mean the upward direction, and the −z-axis direction may mean the downward direction.

Referring to FIGS. 1 and 2, a housing 10 may be provided therein with a reception space 11, and may be open at one surface thereof. An upper case 20 may be mounted on the upper portion of the housing 10 (hereinafter, referred to as an upper housing 13). The upper case 20 may surround the upper housing 13. The upper case 20 may be perforated vertically so as to define an opening O therein. The opening O may communicate with the reception space 11. A cartridge 30 may be inserted into the reception space 11 defined in the housing 10. An aerosol may be generated in the cartridge 30, and may be discharged to the outside through the inside of the cartridge 30.

The opening O may be formed in the upper surface 21 of the upper case 20. The upper surface 21 of the upper case 20 may be disposed over the housing 10. The side surface 22 of the upper case 20 may extend along the circumference of the upper surface 21. A head cover 23, which is a portion of the upper surface 21 of the upper case 20, may cover the upper portion of a container head 33.

A mounting groove 27 may be formed in the inner side of the side surface 22. A mounting protrusion 17 may project outwards from the upper housing 13 so as to be fitted into the mounting groove 27. The mounting protrusion 17 and the mounting groove 27 may be formed at positions corresponding to each other. Each of the mounting protrusion 17 and the mounting groove 27 may include a plurality of mounting protrusions or grooves.

The cartridge 30 may include a first container 31 and a second container 32. For example, the first container 31 may have therein a chamber configured to contain a liquid therein. The second container 32 may have therein a chamber configured to contain a medium. The second container 32 may be rotatably connected or coupled to the first container 31. The second container 32 may be disposed on the first container 31. The first container 31 and the second container 32 may have approximately the same diameter.

A first guide slit 316 may be formed in the outer circumferential surface of the first container 31. The first guide slit 316 may be depressed inwards from the outer circumferential surface of the first container 31. The first guide slit 316 may be formed so as to extend vertically. The first guide slit 316 may extend to the lower end from the upper end of the outer circumferential surface of the first container 31. the outer circumferential surface of the first container 31 may be referred to as an outer facing surface of the first container 31 or an outer surface of the first container 31.

The second guide slit 326 may be formed in the outer circumferential surface of the second container 32. The second guide slit 326 may be depressed inwards from the outer circumferential surface of the second container 32. The second guide slit 326 may be formed so as to extend vertically. The second guide slit 326 may extend to the lower end of the outer circumferential surface of the second container 32 from a predetermined vertical position thereof the outer circumferential surface of the second container 32 may be referred to as an outer facing surface of the second container 32 or an outer surface of the second container 32.

When the second container 32 rotates to a predetermined position, the second guide slit 326 may be aligned with the first guide slit 316. At this position, the lower end of the second guide slit 326 may be connected to the upper end of the first guide slit 316.

The second guide slit 326 may include a portion that is increasingly wide downwards. The second guide slit 326 may be widest at the lower end of the second container 32. The width of the second guide slit 326 may increase upwards from the lower end of the second guide slit 326, and may be maintained at a certain value from a predetermined height. The lower end of the second guide slit 326 may be the same width as the width of the upper end of the first guide slit 316. The width of the first guide slit 316 may be greatest at the lower end and/or the upper end thereof.

The first guide slit 316 may include a plurality of first guide slits, which are arranged along the circumference of the first container 31. The second guide slit 326 may include a plurality of second guide slits, which are arranged along the circumference of the second container 32.

Each of the first and second guide slits 316 and 326 may be referred to as a guide channel or a guide groove.

A holding groove 317 may be formed so as to be depressed inwards from the outer circumferential surface of the first container 31. The holding groove 317 may be formed at a position that is spaced apart from the first guide slit 316. A holding protrusion 117, which is provided at a lower portion of the reception space 11, may be fitted into the holding groove 317 (see FIG. 3).

The cartridge 30 may include the container head 33, which is positioned on the second container 32. The container head 33 may extend upwards from the outer circumferential surface of the second container 32. The container head 33 may be configured such that the upper portion thereof is open. The container head 33 may be open at a portion of the side surface portion thereof. The container head 33 may be configured such that the upper surface portion and the side surface portion thereof are continuously opened so as to form an "L"-shaped opening.

A fitting protrusion 337 may be formed so as to project outwards from one side surface of the container head 33. The fitting protrusion 337 may be inserted into a fitting groove 137 formed in the upper portion of the reception space 11 (see FIG. 5).

The cartridge 30 may include a mouthpiece 34, which is pivotably connected or coupled to the container head 33. The mouthpiece 34 may have formed therein a suction passage 343 (see FIG. 3). The suction passage 343 may communicate both with a second inlet 341 and with a second outlet 342 (see FIG. 5). For convenience of explanation, the suction passage 343 may be referred to as a passage 343 or a second passage 343.

The mouthpiece 34 may be exposed to the outside from the open portion of the container head 33. When the mouthpiece 34 is inserted into the reception space 11, the mouthpiece 34 may be exposed to the outside through the opening O in the upper case 20. The mouthpiece 34 may have a shape corresponding to the opening O. The mouthpiece 34 may be pivotable in the opening O.

A sealing cap 35 may project outwards from the mouthpiece 34. The sealing cap 35 may be coupled to one side of the mouthpiece 34. The sealing cap 35 may be oriented so as to project in the direction in which the mouthpiece 34 is pivoted.

A seating portion 14 may be formed in the upper housing 13. The seating portion 14 may be depressed downwards from the upper housing 13. The seating portion 14 may have a shape corresponding to the mouthpiece 34. When the mouthpiece 34 is pivoted to a certain position while the cartridge 30 is disposed in the reception space 11, the mouthpiece 34 may be seated and received in the seating portion 14.

A holding groove 347 may be formed so as to be depressed inwards from the side surface of the mouthpiece 34. A holding protrusion 147 may project inwards from the side surface of the seating portion 14. The holding protrusion 147 may be removably fitted into the holding groove 347. When the mouthpiece 34 is pivoted and seated in the seating portion 14, the holding protrusion 147 may be inserted into the holding groove 347 such that the mouthpiece 34 is held in the seated position. When the mouthpiece 34 is pivoted in the opposite direction, the holding protrusion 147 may be disengaged from the holding groove 347 such that the mouthpiece 34 becomes separable from the seating portion 14.

A dial 43 may be rotatably disposed in the housing 10. At least a portion of the dial 43 may be exposed to the outside from the housing 10. The dial 43 may be disposed adjacent to the upper housing 13. The dial 43 may be rotated in order to rotate the second container 32.

Referring to FIG. 3, the cartridge 30 may be inserted vertically in the reception space 11 (see FIG. 2) in the housing 10. A battery 50 may be received in the housing 10 so as to be disposed parallel to the reception space 11. A gear assembly 40 may be received in the housing 10 so as to be disposed over the battery 50. The seating portion 14 may be oriented parallel to the reception space 11. The seating portion 14 may be disposed over the battery 50.

The first container 31 may include therein a liquid chamber 311 and an evaporation chamber 312. A material for vaporization may be received in the liquid chamber 311. A wick 313 may be disposed in the evaporation chamber 312. The wick 313 may be formed so as to extend in a forward and backward direction. A heater 314 may be disposed in the evaporation chamber 312. The heater 314 may be disposed around the wick 313 so as to heat the wick 313. The heater 314 may be configured so as to have the form of a coil surrounding the wick 313.

The material for vaporization may be absorbed into the wick 313 from the liquid chamber 311, and may then be introduced into the evaporation chamber 312. The heater 314 may heat the wick 313 to thereby evaporate the material for vaporization absorbed in the wick 313 and thus generate an aerosol. An evaporation passage 318 may communicate with the evaporation chamber 312. The evaporation passage 318 may be formed above the evaporation chamber 312. The evaporation passage 318 may be positioned over the wick 313 and the heater 314. The evaporation passage 318 may be oriented in the longitudinal direction of a container shaft 325, which is disposed vertically.

The second container 32 may include a plurality of chambers 321 and 322, which are isolated from each other. The plurality of chambers 321 and 322 may be respectively referred to as a first granulation chamber 321 and a second granulation chamber 322. Hereinafter, although only the first and second granulation chambers 321 and 322 will be described for convenience of explanation, the second container 32 may include a plurality of chambers 321, 322, . . . , which are isolated from each other, without limiting the number thereof. For example, the plurality of chambers 321, 322, . . . may include four chambers.

The second container 32 may be rotated about the container shaft 325, which is oriented vertically. The plurality of chambers 321 and 322 may be arranged in the rotational direction of the second container 32 around the container shaft 325. The medium may be received in the plurality of chambers 321 and 322. The container shaft 325 may be referred to as a rotating shaft of the second container 32.

A lower chamber hole 323 may be formed in the lower portion of the first granulation chamber 321. The lower chamber hole 323 may be formed in the lower portion of the second granulation chamber 322. An upper chamber hole 324 may be formed in the upper portion of the first granulation chamber 321. The upper chamber hole 324 may be formed in the upper portion of the second granulation chamber 322.

The first container 31 and the second container 32 may be connected to each other via a first connecting passage 319. The first connecting passage 319 may be positioned between the first container 31 and the second container 32. The first connecting passage 319 may be positioned over the evaporation passage 318 so as to communicate with the evaporation passage 318.

When the second container 32 is rotated, the first connecting passage 319 may be connected to one of the plurality of chambers 321 and 322 in the second container 32. The first connecting passage 319 may be connected to the lower chamber hole 323 formed in the lower portion of the first granulation chamber 321. The first connecting passage 319 may be connected to the lower chamber hole 323 formed in the lower portion of the second granulation chamber 322.

Among the plurality of chambers, the remaining chamber or chambers (hereinafter, referred to as a remaining chamber), which is not connected to the first connecting passage 319, may be hermetically closed so as to prevent the entry of external air. The chamber holes in the remaining chamber may be closed.

A first inlet 301 (see FIG. 4) may be formed in the lower portion of the first container 31, and a first outlet 302 may be formed in the upper portion of the second container 32. The first inlet 310 may communicate with the evaporation chamber 312. The evaporation chamber 312 may be positioned over the first inlet 301. The first outlet 302 may communicate with the upper chamber hole 324. The first outlet 302 may be positioned over the upper chamber hole 324. A second connecting passage 329 (see FIG. 5) may be connected to the first outlet 302 and the upper chamber hole 324. The second connecting passage 329 may be positioned between the first outlet 302 and the upper chamber hole 324. The first outlet 302 may face the second inlet 341 so as to communicate with the suction passage 343. A user may inhale air through the mouthpiece 34. Air may be discharged upwards through the first outlet 302. The passage formed in the cartridge 30 may be referred to as a first passage or a cartridge passage. The first passage may communicate with the first inlet 301 and the first outlet 302. The air that is introduced through the first inlet 301 may be discharged from the first outlet 302 through the first passage. The first passage may be formed by connecting one of the plurality of chambers in the second container 32 to the passage formed in the first container 31.

When the cartridge 30 is inserted into the reception space 11, the head cover 23 of the upper case 20 may be disposed over the container head 33. The head cover 23 may cover the upper portion of the container head 33.

Consequently, it is possible to prevent the cartridge 30 from escaping outwards from the reception space 11.

The holding protrusion 117 may be disposed at the lower portion of the reception space 11, and may project toward the inside of the reception space 11. When the cartridge 30 is inserted into the reception space 11, the holding protrusion 117 may be fitted into the holding groove 317 (see FIG. 2).

Consequently, when the second container 32 is rotated in the reception space 11, the first container may be held in place without being rotated together with the second container 32.

The fitting groove 137 may be formed in the upper side of the reception space 11. When the cartridge 30 is inserted into the reception space 11, the fitting protrusion 337 may be fitted into the fitting groove 137 (see FIG. 5).

Accordingly, when the cartridge 30 is inserted into the reception space 11, a user is able to dispose the cartridge 30 at the correct position.

Consequently, when the second container 32 is rotated in the reception space 11, the container head 33 may be held in place without being rotated together with the second container 32.

The gear assembly 40 may rotate the second container 32. The gear assembly 40 may be mounted in the housing 10. The gear assembly 40 may include at least one of a cartridge gear 41, a dial gear 42, and the dial 43.

The dial gear 42 may be mounted in the housing 10. The dial gear 42 may include a rotating shaft, which is parallel to the rotating shaft of the second container 32. The rotating shaft of the dial gear 42 and/or the rotating shaft of the dial 43 may be referred to as a dial shaft 45. The dial shaft 45 of the dial gear 42 may be oriented parallel to the container shaft 325. The dial gear 42 may be disposed over the battery 50. The dial gear 42 may be disposed adjacent to the side surface of the cartridge 30. The dial gear 42 may be disposed adjacent to the side surface of the second container 32.

The dial gear 42 may be rotated by rotating the dial 43. The dial gear 42 may be rotated by receiving power from a motor (not shown).

The dial gear 42 may be rotated while being engaged with the second container 32. The dial gear 42 may be rotated while being directly engaged with the outer circumferential surface of the second container 32.

The cartridge gear 41 may be rotatably mounted in the housing 10. The cartridge gear 41 may be positioned coaxially with the second container 32.

The cartridge gear 41 may be configured to have the form of a ring, the inner circumferential surface of which defines therein a space. The inner circumferential surface of the cartridge gear 41 may be configured to surround the reception space 11. The inner circumferential surface of the cartridge gear 41 may be engaged with the outer circumferential surface of the second container 32 so as to rotate therewith. The dial gear 42 may be engaged with the outer circumferential surface of the cartridge gear 41 so as to rotate therewith. the inner circumferential surface of the cartridge gear 41 may be referred to as an inner facing surface of the cartridge gear 41 or an inner surface of the cartridge gear 41.

The dial 43 may be mounted in the housing 10. At least a portion of the dial 43 may be exposed to the outside from the housing 10. The dial 43 may be positioned coaxially with the dial gear 42. The dial 43 may be rotated together with the dial gear 42 about the dial shaft 45. The dial shaft 45 may be disposed parallel to the container shaft 325.

Consequently, a user is able to rotate the second container 32 by rotating the dial 43 at the outside of the housing 10.

The dial 43 may be mounted to the upper housing 13. The dial 43 may be mounted over the battery 50.

Consequently, a user is able to conveniently rotate the dial 43 while gripping the aerosol-generating device.

A rotary switch 44 may be mounted coaxially with the dial gear 42 and/or the dial 43. The rotary switch 44 may be disposed over the battery 50. The rotary switch 44 may detect the rotational position of the dial gear 42 and/or the dial 43 and may thus detect the position of the second container 32.

A controller 70 may determine with which of the plurality of granulation chambers the first connecting passage 319 and the first outlet 302 communicate using the rotary switch 44.

The battery 50 may be disposed at the lateral side of the reception space 11. The battery 50 may be disposed parallel to the reception space 11 and/or the cartridge 30. The battery 50 may be disposed adjacent to the dial gear 42 and the reception space 11 in the longitudinal direction of the rotating shaft of the dial gear 42.

Accordingly, even when the volume of the battery 50 is increased in order to increase the capacity of the battery 50, the aerosol-generating device may have a compact structure suitable for being held in a user's hand without unnecessarily increasing the length thereof.

Consequently, it is possible to ensure spaces for accommodating therein the gear assembly 40, the seating portion 14, a flow sensor 60, a vibration motor and the like above and below the battery 50.

The flow sensor 60 may be disposed under the battery 50. The flow sensor 60 may be disposed so as to face the side surface of the lower portion of the reception space 11. A sensing hole 61 may be formed between the flow sensor 60 and the reception space 11. The flow sensor 60 may detect the flow of the air that is introduced into the cartridge 30 through the first inlet 301.

The seating portion 14 may be formed in the upper housing 13 over the battery 50. The seating portion 14 may be positioned above the dial gear 42 and the dial 43. The seating portion 14 may be positioned over the dial gear 42 and/or the dial 43 in the longitudinal direction of the rotating shaft of the dial gear 42.

A socket 80 may be mounted on one surface of the housing 10. The socket 80 may be connected to a charging terminal so as to supply power to the battery 50 and the like.

The vibration motor 90 may be received in the housing 10. The vibration motor 90 may be disposed at the lower portion of the housing 10. The vibration motor 90 may be disposed adjacent to the controller 70. The controller 70 may be disposed under the battery 50.

The controller 70 may be received in the lower portion of the housing 10. The controller 70 may be disposed under the reception space 11. The controller 70 may be electrically connected to components such as the heater 314, the rotary switch 44, the battery 50, the flow sensor 60, the socket 80, the vibration motor 90, and the like. The controller 70 may control the operation of the components, which are electrically connected thereto.

The controller 70 may control the heater 314 to heat the wick 313 to thus generate an aerosol. The controller 70 may operate the flow sensor 60. The controller 70 may control the operation of the internal components based on the information corresponding to the result of detection of air flow. The controller 70 may receive an electric signal from the rotary switch 44. The controller 70 may control the operation of the components based on the electric signal received from the rotary switch 44. The controller 70 may operate the vibration motor 90 to transmit the vibration to a user.

Referring to FIG. 4, the first container 31 may include a cylinder 310, which defines the appearance thereof. The liquid chamber 311 may be formed in the cylinder 310. The evaporation passage 318 may be formed in the cylinder 310. The evaporation passage 318 may be formed in an evaporation pipe 3180, which extends vertically. The evaporation pipe 3180 may be surrounded by the liquid chamber 311.

An evaporation housing 3120 may extends downwards from the evaporation pipe 3180. The lower portion of the evaporation housing 3120 may be enlarged radially outwards so as to be connected to the cylinder 310. The evaporation chamber 312 may be formed in the evaporation housing 3120. The evaporation chamber 312 may be connected to the evaporation passage 318 in a vertical direction.

The wick 313 may be disposed in the evaporation housing 3120. The heater 314 may be disposed in the evaporation housing 3120. The heater 314 may be wound around the wick 313 so as to surround the wick 313.

A wick hole 3121 may be formed in the evaporation housing 3120 so as to connect the liquid chamber 311 to the evaporation chamber 312. The wick 313 may be inserted into the wick hole 3121. The material for vaporization may be introduced through the wick hole 3121 so as to wet the wick 313.

A cap 36 may define the bottom surface of the cartridge 30. The cap 36 may be disposed at the lower portion of the first container 31. The cap 36 may cover the lower portion of the cylinder 310. The outer surface of the cap 36 may be rounded upwards so as to be connected to the outer circumferential surface of the cylinder 310. the outer circumferential surface of the cylinder 310 may be referred to as an outer facing surface of the cylinder 310 or an outer surface of the cylinder 310. The first inlet 301 may be formed through the cap 36. The first inlet 301 may be connected to the evaporation chamber 312.

A first extension 362 may extend upwards from the bottom 361 of the cap 36 so as to surround the first inlet 301. The first extension 362 may define a step with respect to the bottom 361 of the cap 36.

Consequently, it is possible to prevent the material for vaporization that leaks from the liquid chamber 311 from being discharged to the outside of the cartridge 30 through the first inlet 301.

A connector 365 may extend upwards from the circumferential portion of the cap 36. The connector 365 may be fitted into the inner circumferential surface of the lower portion of the cylinder 310. the inner circumferential surface of the cylinder 310 may be referred to as an inner facing surface of the cylinder 310 or an inner surface of the cylinder 310.

A rim 367 may extend upwards from the connector 365. The rim 367 may be spaced inwards apart from the inner circumferential surface of the cylinder 310.

A lower sealant or lower seal 37 may be disposed between the cap 36 and the evaporation chamber 312. The lower seal 37 may define the evaporation chamber 312 in conjunction with the evaporation housing 3120. An evaporation inlet 371 may be vertically formed through the lower seal 37. The evaporation inlet 371 may be positioned between the first inlet 301 and the evaporation chamber 312, and may be connected to the first inlet 301 and the evaporation chamber 312.

A second extension 372 may extend upwards from the lower seal 37 so as to surround the evaporation inlet 371. The second extension 372 may define a step with respect to the bottom surface of the lower seal 37.

Consequently, it is possible to prevent the material for vaporization that leaks from the liquid chamber 311 from being discharged to the outside of the cartridge 30 through the evaporation inlet 371 and the first inlet 301.

An upper rim 375 may extend upwards from the outer circumferential portion of the lower seal 37. A rib 3122 may extend downwards from the evaporation housing 3120. The upper rim 375 may be fitted between the rib 3122 and the inner circumferential surface of the cylinder 310.

A lower rim 377 may extend downwards from the outer circumferential portion of the lower seal 37. The lower rim 377 may be fitted between the rim 367 of the cap 36 and the inner circumferential surface of the cylinder 310.

The outer circumferential surfaces of the upper rim 375 and the lower rim 377 may define a continuous surface. The upper rim 375 and the lower rim 377 may be in contact with the inner circumferential surface of the cylinder 310. the outer circumferential surface of the upper rim 375 may be referred to as an outer facing surface of the upper rim 375 or an outer surface of the upper rim 375.

Hereinafter, the flow of air and aerosol when a user inhales air through the mouthpiece 34 will be described with reference to FIGS. 3 and 4.

When a user inhales air through the mouthpiece 34, the air may be introduced from the outside of the housing 10, and may pass through the reception space 11 between the housing 10 and the cartridge 30. The air that has passed through the reception space 11 between the housing 10 and the cartridge 30 may be introduced into the evaporation chamber 312 in the first container 31 through the first inlet 301. The introduced air may pass through the evaporation passage 318 together with the aerosol contained in the evaporation chamber 312. The aerosol that has passed through the evaporation passage 318 may be introduced into the second granulation chamber 322 sequentially through the first connecting passage 319 and the lower chamber hole 323. The aerosol may pass through the medium in the second granulation chamber 322, the upper chamber hole 324, and the first outlet 302 in that order. The aerosol that has passed through the first outlet 302 may be discharged upwards through the second inlet 341, the suction passage 343, and the second outlet 342.

Referring to FIGS. 5 and 6, the cartridge gear 41 may include an inner circumferential protrusion 416, which is inserted into the second guide slit 326. The inner circumferential protrusion 416 may project inwards from the inner circumferential surface of the cartridge gear 41. The inner circumferential protrusion 416 may be engaged with the second guide slit 326 such that the cartridge gear 41 is rotated together with the second container 32.

The second guide slit 326 may extend in the longitudinal direction of the rotating shaft of the second container 32. The second guide slit 326 may vertically guide the cartridge 30 along the inner circumferential protrusion 416. When the cartridge 30 is inserted into the reception space 11, the inner circumferential protrusion 416 may catch on the upper end of the second guide slit 326. The upper end of the second guide slit 326 may serve as a stopper configured to prevent further downward movement of the cartridge 30.

The first guide slit 316 may extend in the longitudinal direction of the second guide slit 326. The first guide slit 316 and the second guide slit 326 may define a continuous surface such that the cartridge 30 is guided vertically along the inner circumferential protrusion 416.

The mouthpiece 34 may be pivotably connected or coupled to the container head 33. FIG. 5 illustrates the state in which the mouthpiece 34 is pivoted so as to be positioned at a first position. FIG. 6 illustrates the state in which the mouthpiece 34 is pivoted so as to be positioned at a second position.

Hereinafter, the state in which the mouthpiece 34 is pivoted so as to be positioned at the first position will be described with reference to FIG. 5.

When the mouthpiece 34 is pivoted so as to be positioned at the first position, the mouthpiece 34 may be seated in the seating portion 14 so as to close the upper portion of the housing 10. The mouthpiece 34 may close the opening O in the upper case 20. One surface of the mouthpiece 34 may be exposed to the outside through the opening O.

The suction passage 343 in the mouthpiece 34 may be disposed in the upper case 20. The suction passage 343 may be oriented so as not to be aligned with the longitudinal direction of the cartridge 30.

The sealing cap 35 may project downwards from the mouthpiece 34. The sealing cap 35 may be configured to have the form of a hook. The sealing cap 35 may close the first outlet 302.

Consequently, the medium and the material for vaporization contained in the cartridge and the internal components may be protected from the external environment.

The sealing cap 35 may have an outer surface, which is rounded in the direction in which the mouthpiece 34 pivots. Accordingly, when the mouthpiece 34 is pivoted so as to be positioned at the first position, the sealing cap 35 does not catch on the surface surrounding the first outlet 302.

Next, the state in which the mouthpiece 34 is pivoted so as to be positioned at the second position will be described with reference to FIG. 6.

When the mouthpiece 34 is pivoted so as to be positioned at the second position, the mouthpiece 34 may be separated from the seating portion 14. The sealing cap 35 may be separated from the first outlet 302 so as to open the first outlet 302.

The first outlet 302 may come into contact with the second inlet 341. The suction passage 343 in the mouthpiece 34 may communicate with the first outlet 302. The suction passage 343 in the mouthpiece 34 may communicate with the space in the first container 31 and the space in the second container 32 through the first outlet 302.

The suction passage 343 may be oriented so as to extend in the longitudinal direction of the cartridge 30. The suction passage 343 may be oriented so as to extend vertically. The sealing cap 35 may be disposed so as to project toward the seating portion 14.

Hereinafter, the directions of the mouthpiece 34 are defined based on the orthogonal coordinate system shown in FIGS. 7 to 9. In the orthogonal coordinate system, a forward direction FD may be defined as the forward direction of the mouthpiece 34. A rearward direction RD may be defined as the rearward direction of the mouthpiece 34. A lateral direction LD may be defined as the rightward and leftward direction or the lateral direction of the mouthpiece 34. An upward direction UD may be defined as the upward direction of the mouthpiece 34. A downward direction DD may be defined as the downward direction of the mouthpiece 34.

Referring to FIGS. 7 and 8, the mouthpiece 34 may be configured to be elongated in the forward and backward direction of the mouthpiece 34. The mouthpiece 34 may be configured to have a flat shape. The second inlet (or the introduction inlet) 341 may be formed in the rear portion of the mouthpiece 34. The second outlet 342 may be formed in the front portion of the mouthpiece 34.

The suction passage 343 (see FIG. 6) may be formed in the mouthpiece 34, and may extend in a forward and backward direction. The second inlet 341 may be positioned at one end of the suction passage 343. The second outlet 342 may be positioned at the other end of the suction passage 343. The distance between the pivot shaft 355 and the second outlet 342 may be greater than the distance between the pivot shaft 355 and the second inlet 341. The suction passage 343 may be referred to as a second passage 343.

Accordingly, a user is able to inhale air while holding the portion of the second outlet 342 in his/her mouth.

The holding groove 347 may be formed as a depression in a side surface of the mouthpiece 34. The holding groove 347 may include two holding grooves formed in two side surfaces of the mouthpiece 34. The holding groove 347 may positioned closer to the second outlet 342 than to the second inlet 341.

The mouthpiece 34 may include the sealing cap 35. The sealing cap 35 may project outwards from the mouthpiece 34. The sealing cap 35 may project downwards from the mouthpiece 34. The sealing cap 35 may be integrally formed with the mouthpiece 34. The sealing cap 35 may be coupled to the mouthpiece 34. The sealing cap 35 may be disposed closer to the second inlet 341 than to the second outlet 342.

The mouthpiece 34 may be pivotable about the pivot shaft 355. The pivot shaft 355 may be thought of as the center of the pivoting action of the mouthpiece 34 or a pivot center. The pivot shaft 355 may project in a rightward and leftward directions from two side surfaces of the mouthpiece 34 or the sealing cap 35. The pivot shaft 355 may be disposed so as to be perpendicular to the vertical direction. The pivot shaft 355 may be positioned closer to the second inlet 341 than to the second outlet 342.

The sealing cap 35 may include an extension 352, which extends downwards from the mouthpiece 34. The sealing cap 35 may include a first sealing surface 356, which extends in the rearward direction of the mouthpiece 34 from the lower end of the extension 352. The first sealing surface 356 may define the outer surface of the lower end of the sealing cap 35.

When the mouthpiece 34 is pivoted, the first sealing surface 356 may come into contact with the region around the first outlet 302. When the mouthpiece 34 is positioned at the first position, the first sealing surface 356 is disposed over the first outlet 302 so as to close the first outlet 302 (see FIG. 5). When the mouthpiece 34 is positioned at the first position, the first sealing surface 356 may come into close contact with a gasket 331 (see FIG. 11), which is disposed around the first outlet 302. The gasket 331 may alternatively be referred to as a docking member or a docking ring.

The first sealing surface 356 may include a portion that extends while being rounded in the direction in which the mouthpiece 34 is pivoted. The first sealing surface 356 may include a first planar portion 356*a*, which is formed to have a planar surface, and a first round portion 356*b*, which is rounded in the direction in which the mouthpiece 34 is pivoted.

The first planar portion 356a may define the lower surface of the extension 352. The first round portion 346b may define a surface that extends toward the second inlet 341 from the first planar portion 356a while being rounded. The first round portion 356b may have a curvature radius, the center of which is positioned adjacent to the pivot center of the mouthpiece 34.

Consequently, when the mouthpiece 34 is pivoted, the mouthpiece 34 may smoothly pivot between the first and second positions without the first sealing surface 356 of the sealing cap 35 catching on the surface around the first outlet 302. The end of the sealing surface 356 and/or the sealing cap 35 may be spaced apart from the lower surface of the mouthpiece 34 so as to define a space S between the mouthpiece 34 and the end. The front side and the lower side of the space S may be surrounded by the extension 352 and the first sealing surface 356. The extension 352 and the first sealing surface 346 of the sealing cap 35 may define a hook-shaped section.

The sealing cap 35 may be made of an elastic material. For example, the sealing cap 35 may be made of a plastic material.

Accordingly, when the mouthpiece 34 is positioned at the first position, the first sealing surface 356 may come into contact with the first outlet 302, and may press the first outlet 302 while being pushed toward the space S.

The mouthpiece 34 may include a second sealing surface 346, which constitutes the rear surface of the mouthpiece 34 and surrounds the second inlet 341. The second sealing surface 346 may define the outer surface of the mouthpiece 34 around the second inlet 341.

When the mouthpiece 34 is pivoted, the second sealing surface 346 may come into contact with the region around the first outlet 302. When the mouthpiece 34 is positioned at the second position, the second sealing surface 346 may be disposed so as to surround the first outlet 302, and the second inlet 341 may communicate with the first outlet 302 (see FIG. 6). When the mouthpiece 34 is positioned at the second position, the second sealing surface 346 may come into close contact with the gasket 331 (see FIG. 11), which is disposed around the first outlet 302.

The second sealing surface 346 may include a portion that extends while being rounded in the direction in which the mouthpiece 34 is pivoted. The second sealing surface 346 may include a planar portion 346a, which is formed to have a planar surface, and a second round portion 346b, which is rounded in the direction in which the mouthpiece 34 is pivoted. The second planar portion 346a may be formed higher than the second round portion 346b.

The second round portion 346b may constitute a surface that extends while being rounded in the direction in which the mouthpiece 34 is pivoted. The second round portion 346b may have a predetermined curvature. The center of the curvature of the second round portion 346b may be positioned adjacent to the pivot center of the mouthpiece 34. The second planar portion 346a may extend from the second round portion 346b in the upward direction of the mouthpiece 34 to define a planar surface.

Consequently, when the mouthpiece 34 is pivoted, the second sealing surface 346 of the mouthpiece 34 may smoothly pivot between the first and second positions without catching on the surface around the first outlet 302.

A spring 344 may be connected to the mouthpiece 34. The spring 344 may be exposed to the outside of the mouthpiece 34 through a slit 354 formed in the sealing cap 35. A portion of the spring 344 may be exposed downwards from the mouthpiece 34.

Referring to FIG. 9, the sealing cap 35 may include an assembly protrusion 359, which projects inwards. The assembly protrusion 359 may include two assembly protrusions, which are formed on two inner side surfaces of the sealing cap 35. The mouthpiece 34 may have an assembly groove 349, which is depressed inwards. The assembly groove 359 may include two assembly grooves, which are formed in two side surfaces of the mouthpiece 34. The assembly protrusions 359 may be fitted into the assembly grooves 349. The sealing cap 35 may be assembled with the mouthpiece 34 so as to project downwards from the mouthpiece 34.

The mouthpiece 34 may include a spring-coupling shaft 345, which projects outwards from a side surface thereof. The spring-coupling shaft 345 may be formed coaxially with the pivot shaft 355. The spring 344 may be wound around the spring-coupling shaft 345 so as to extend in the longitudinal direction of the spring-coupling shaft 345. One end of the spring 344 may be in contact with the mouthpiece 34 and the other end of the spring 344 may be exposed from the mouthpiece 34.

Referring to FIGS. 10 and 11, the mouthpiece 34 may be pivotably connected or coupled to the container head 33. Shaft holes 335 may be formed in two side surfaces of the container head 33. The pivot shafts 355 may be fitted into the shaft holes 335. The mouthpiece 34 may be pivotable about the pivot shafts 355, which are fitted into the shaft holes 335.

The container head 33 may be configured to have a cylinder form, which extends upwards from the outer circumferential surface of the second container 32. The shaft holes 335 may be formed in two side surfaces of the upper portion of the container head 33. The container head 33 may be open at the upper surface thereof such that the mouthpiece 34 is disposed in the container head 33. A portion of one side surface of the container head 33 may be open. The container head 33 may be configured such that the upper surface portion and the side surface portion thereof are continuously opened so as to have an "L" shape. The mouthpiece 34 may be pivotable in the open area of the container head 33.

The first outlet 302 may be formed in the bottom surface of the container head 33. The first outlet 302 may be connected to the connecting passage 329 formed in the upper portion of the second container 32. The aerosol generated from the cartridge 30 may be discharged from the first outlet 302 through the connecting passage 329.

The gasket 331 may be formed around the first outlet 302. The gasket 331 may surround the first outlet 302 at the bottom surface of the container head 33. The gasket 331 may project upwards from the bottom surface of the container head 33. The gasket 331 may be fixed to the bottom surface of the container head 33. The gasket 331 may have a shape corresponding to the circumference of the second inlet 341 so as to surround the second inlet 341. The gasket 331 may be made of an elastic material such as rubber or silicone.

When the mouthpiece 34 is positioned at the first position, the gasket 331 may come into close contact with the first sealing surface 356 of the sealing cap 35. When the mouthpiece 34 is positioned at the second position, the gasket 331 may come into contact with the second sealing surface 346, which constitutes the rear surface of the mouthpiece 34 around the second inlet 341.

The container head 33 may therein have a spring-fitting hole 334. The spring-fitting hole 334 may be formed in the inner surface of the container head 33. The spring-fitting hole 334 may extend upwards, and may be open at the upper portion thereof. The end of the spring 344 that is exposed downwards from the mouthpiece 34 may be fitted and fixed in the spring-fitting hole 334. The spring 344 may be fixed in the container head 33 and may be connected to the mouthpiece 34 so as to press the mouthpiece 34 toward the second position. The spring 344 may move the mouthpiece 34 to the second position by virtue of the restoring force thereof.

The container head 33 may be coupled to the upper side of the second container 32. An assembly hole 338 may be formed in the bottom surface of the container head 33. An assembly screw 328 may be engaged with the upper portion of the second container 32 through the assembly hole 338.

Referring to FIGS. 12 and 13, the cartridge gear 41 may be rotatably mounted in the housing 10. The cartridge gear 41 may be configured to have the form of a ring (see FIG. 15). A gear-fitting hole 411 may define a cavity in the cartridge gear 41. The gear-fitting hole 411 may be defined by the inner circumferential surface of the cartridge gear 41. The gear-fitting hole 411 may be disposed such that the inner circumferential surface thereof surrounds the reception space 11. The gear-fitting hole 411 may be positioned in the reception space 11.

An inner circumferential protrusion 416 may project toward the reception space from the inner circumferential surface of the cartridge gear 41. The inner circumferential protrusion 416 may include a plurality of inner circumferential protrusions 416, which are circumferentially arranged around the rotating axis, which extends vertically. The inner circumferential protrusion 416 may be elongated vertically so as to be fitted into the first and second guide slits 316 and 326.

The reception space 11 may be elongated. The reception space 11 may extend in the longitudinal direction of the cartridge 30. The reception space 11 may extend vertically.

The inner circumferential protrusion 416 may extend in the longitudinal direction of the reception space 11. The inner circumferential protrusion 416 may extend in the longitudinal direction of the first guide slit 316. The inner circumferential protrusion 416 may extend in the longitudinal direction of the second guide slit 326.

The reception space 11 may be open at one surface thereof. The reception space 11 may be open at the upper side thereof.

The gear-fitting hole 411 may be open at the surface thereof that faces the open surface of the reception space 11. The gear-fitting hole 411 may also be open at the surface thereof opposite the one open surface. Both the one surface and the other surface of the gear-fitting hole 411 may be open. The gear-fitting hole 411 may be open at a side thereof through which the cartridge 30 is inserted. The gear-fitting hole 411 may be open at a side thereof through which the cartridge 30 is removed therefrom. The gear-fitting hole 411 may be open at both the upper and lower sides thereof.

The inner circumferential protrusion 416 may include sloped surfaces 416a and 416b. The length of the inner circumferential protrusion 416 may be greater at the outer side thereof than at the inner side thereof. The inner circumferential protrusion 416 may be configured to have a trapezoidal form.

The sloped surfaces 416a and 416b may be positioned at the two ends of the inner circumferential protrusion 416 in the longitudinal direction thereof. The sloped surfaces 416a and 416b may include a first sloped surface 416a and a second sloped surface 416b, which are respectively positioned at the two ends of the inner circumferential protrusion 416 in the longitudinal direction.

The first sloped surface 416a may be positioned at one end of the inner circumferential protrusion 416 in the longitudinal direction. The first sloped surface 416a may be positioned at the end of the inner circumferential protrusion 416 at which the open surface of the reception space 11 is located. The first sloped surface 416a may be positioned at the end of the inner circumferential protrusion 416 at which the surface of the gear-fitting hole 411 is located. The first sloped surface 416a may be positioned at the upper portion of the inner circumferential protrusion 416.

The second sloped surface 416b may be positioned at the other end of the inner circumferential protrusion 416 in the longitudinal direction. The second sloped surface 416b may be positioned at the other end of the inner circumferential protrusion 416, at which the surface opposite the open surface of the reception space 11 is positioned. The second sloped surface 416b may be positioned at the other end of the inner circumferential protrusion 416 at which the other surface (opposite the one surface) of the gear-fitting hole 411 is positioned. The second sloped surface 416b may be positioned at the lower portion of the inner circumferential protrusion 416.

The first sloped surface 416a may face the open surface of the reception space 11. The first sloped surface 416a may face both the open surface of the reception space 11 and the central axis of the reception space 11. The first sloped surface 416a may be inclined toward the central axis of the reception space 11 moving in the direction in which the cartridge 30 is inserted into the reception space 11. The first sloped surface 416a may be inclined toward the central axis of the reception space 11 moving downwards.

The first sloped surface 416a may face the open surface of the gear-fitting hole 411. The first sloped surface 416a may face both the open surface of the gear-fitting hole 411 and the central axis of the gear-fitting hole 411. The first sloped surface 416a may be inclined toward the central axis of the gear-fitting hole 411 moving in the direction in which the cartridge 30 is inserted into the gear-fitting hole 411. The first sloped surface 416a may be inclined toward the central axis of the gear-fitting hole 411 moving downwards.

The upper end of the second guide slit 326 may face the first sloped surface 416a (see FIG. 5). The upper end of the second guide slit 326 may be inclined so as to be parallel to the first sloped surface 416a (see FIG. 5).

The second sloped surface 416b may face the direction opposite the direction faced by the open surface of the reception space 11. The second sloped surface 416b may face the direction opposite the direction faced by the open surface of the reception space 11 and may face toward the central axis of the reception space 11. The second sloped surface 416b may be inclined toward the central axis of the reception space 11 moving in the direction in which the cartridge 30 is taken out of the reception space 11. The second sloped surface 416b may be inclined toward the central axis of the reception space 11 moving upwards.

The second sloped surface 416b may face the direction opposite the direction faced by the open surface of the gear-fitting hole 411. The second sloped surface 416b may face the other open surface of the gear-fitting hole 411. The second sloped surface 416b may face the direction opposite the direction faced by the open surface of the gear-fitting hole 411 and may face toward the central axis of the gear-fitting hole 411. The second sloped surface 416b may be inclined toward the central axis of the gear-fitting hole 411 moving in the direction in which the cartridge 30 is taken out of the gear-fitting hole 411. The second sloped surface 416b may be inclined toward the central axis of the reception space 11 moving upwards.

Accordingly, it is possible to easily insert the cartridge 30 into the reception space 11.

Accordingly, it is possible to easily take the cartridge 30 out of the reception space 11.

Accordingly, it is possible to easily insert the cartridge 30 into the gear-fitting hole 411.

Accordingly, it is possible to easily take the cartridge 30 out of the gear-fitting hole 411.

Accordingly, it is possible to easily insert the cartridge 30 into the reception space 11 even when the first guide slit 316 and the inner circumferential protrusion 416 are not aligned with each other.

Accordingly, it is possible to easily insert and take out the cartridge 40 even when the first guide slit 316 and the second guide slit 326 are not aligned with each other.

Referring to FIGS. 14 to 16, the cartridge 30 may be fitted into the gear-fitting hole 411 formed in the cartridge gear 41. The cartridge 30 may be fitted in the direction of the rotating axis of the cartridge gear 41. The direction of the rotating axis of the cartridge gear 41 may be a vertical direction.

The inner circumferential protrusion 416 may be fitted into the first and second guide slits 316 and 326. The inner circumferential protrusion 416 may guide fitting of the cartridge 30 into the reception space 11 by sliding along the first and second guide slits 316 and 326. The guide slit 316 and the second guide slit 326 may sequentially come into contact with the inner circumferential protrusion 416.

The first guide slit 316 may include a plurality of first guide slits, which are arranged in the circumferential direction of the cartridge 30. The second guide slit 326 may include a plurality of second guide slits, which are arranged in the circumferential direction of the cartridge 30. The inner circumferential protrusion 416 may include a plurality of inner circumferential protrusions, which are arranged in the circumferential direction of the cartridge 41. The plurality of inner circumferential protrusions 416 may be arranged at positions corresponding to the plurality of second guide slits 326. Each of the plurality of inner circumferential protrusions 416 may be fitted into a corresponding one of the plurality of second guide slits 326.

The circumferential direction of the cartridge 30 may be the same as the rotational direction of the second container 32. The circumferential direction of the cartridge gear 41 may be the same as the rotational direction of the cartridge gear 41. The rotational direction of the second container 32 may be the same as the rotational direction of the cartridge gear 41.

When the cartridge 30 is completely inserted into the reception space 11, the holding protrusion 117 (see FIG. 12) may be fitted into the holding groove 317, thereby holding the first container 31 in position. When the cartridge 30 is completely inserted into the reception space 11, the fitting protrusion 337 may be fitted into the fitting groove 137 (see FIG. 6), thereby holding the container head 33 in position. When the cartridge 30 is completely inserted into the reception space 11, the inner circumferential protrusion 416 may be positioned at the upper end of the second guide slit 326.

Consequently, when the cartridge gear 41 is rotated, the second container 32 may be rotated because the inner circumferential protrusion 416 is engaged with the second guide slit 326. When the second container 32 is rotated, the position of the first container 31 may be held. When the second container 32 is rotated, the position of the container head 33 and the position of the mouthpiece 34 may be held.

The second guide slit 326 may include a portion that is increasingly wider moving downwards. The second guide slit 326 may have the maximum width at the lower end of the second container 32. The width w2 of the second guide slit 326 may continually decrease moving upwards from the lower end, and may maintain a constant value w1 from a predetermined height to the upper end thereof. The width w2 of the lower part of the second guide slit 326 may be greater than the width w1 of the upper part of the second guide slit 326.

The width w3 of the first guide slit 316 may become equal to the width w2 of the lower end of the second guide slit 326 at the portion thereof that abuts the lower end of the second guide slit 326. The width w3 of the first guide slit 316 may be equal to or greater than the width w1 of the upper part of the second guide slit 326.

The second guide slit 326 may have a portion that has the same width as the width of the inner circumferential protrusion 416. The width w1 of the upper part of the second guide slit 326 may be equal to the width w0 of the inner circumferential protrusion 416 (see FIG. 13). The width w2 of the lower part of the second guide slit 326 may be greater than the width w0 of the inner circumferential protrusion 416. The width w3 of the first guide slit 316 may be greater than the width w0 of the inner circumferential protrusion 416.

Accordingly, even when the cartridge 30 is fitted into the gear-fitting hole 411 in the state in which the first guide slit 316 is misaligned with the second guide slit 326, the inner circumferential protrusion 416 slides along the side surfaces of the first guide slit 316 and the second guide slit 326, thereby aligning the first guide slit 316 with the second guide slit 326.

Consequently, since the first connecting passage 319 precisely communicates with the lower chamber hole 323, it is possible to prevent a decrease in aerosol flow efficiency.

Referring to FIGS. 16 and 17, the cartridge gear 41 may be engaged with the dial gear 41 so as to be rotated therewith. The rotating shaft of the cartridge 41 and the rotating shaft of the dial gear 42 may be oriented parallel to each other.

First gear teeth 412 may be formed on the outer circumferential surface of the cartridge gear 41. Second gear teeth 422 may be formed on the outer circumferential surface of the dial gear 42. The first gear teeth 412 and the second gear teeth 422 may be engaged with each other so as to be rotated together. The height of the first gear teeth 412 may be equal to the height of the second gear teeth 422. the outer circumferential surface of the dial gear 42 may be referred to as an outer facing surface of the dial gear 42 or an outer surface of the dial gear 42.

The dial 43 may be connected to the dial gear 42 so as to be rotated therewith. The dial 43 and the dial gear 42 may be coaxially disposed.

An concavo-convex portion 432 may be formed on the outer circumferential surface of the dial 43. The height of the concavo-convex portion 432 may be lower than the height of the first gear teeth 412 and the height of the second gear teeth 412. the outer circumferential surface of the dial 43 may be referred to as an outer facing surface of the dial 43 or an outer surface of the dial 43.

A user is able to rotate the dial 43 at the outside of the housing 10 (see FIG. 1). When the dial 43 is rotated by a user, the dial gear 42 and the cartridge gear 41 are sequentially rotated, thereby rotating the second container 32.

Referring to FIGS. 15 and 18, the cap 36 may constitute the bottom surface of the cartridge 30. A fitting hole 307 may be formed in the cap 36 by depressing the lower surface of the cap 36 upwards. The fitting hole 307 may be positioned so as to be spaced apart from the center of the cap 36. The fitting hole 307 may be spaced apart from an axis extending from the rotating shaft of the second container 32.

A base 16 may be configured to surround the lower portion of the reception space 11. A fitting protrusion 167 may project upwards from the bottom surface 168 of the base 16. The fitting protrusion 167 may be positioned so as to be spaced apart from the center of the base 16. The fitting protrusion 167 may be spaced apart from an axis extending from the rotating shaft of the second container 32.

The fitting hole 307 may be positioned at a position corresponding to the fitting protrusion 167. When the cartridge 30 is inserted into the reception space 11, the fitting protrusion 167 may be fitted into the fitting hole 307.

The fitting protrusion 167 may be configured to have the form of a circular pillar, which extends upwards. The upper portion of the fitting protrusion 167 may become narrow moving upwards. The upper end of the fitting protrusion 167 may be rounded.

Accordingly, the first container 31 and the cartridge 30 may be disposed at a specified position.

Accordingly, even when the fitting protrusion 167 is not precisely aligned with the fitting hole 307, the upper end of the fitting protrusion 167 may be guided into the fitting hole 307, thereby guiding the cartridge to the correct position.

Accordingly, the first container 31 may be maintained in place even when the second container 32 is rotated.

A first terminal 164 may project upwards from the bottom surface 168 of the base 16. The first terminal 164 may be composed of a pair of terminals, and may be spaced apart from the center of the base 16 by the same distance. The first terminal 164 may be configured to have the form of a circular pillar that extends upwards. The first terminal 164 may receive power from the battery 50.

A second terminal 304 may be formed on the bottom surface of the cap 36. The second terminal 304 may be composed of a pair of terminals, and may be spaced apart from the center of cap 36 by the same distance. The second terminal 304 may be electrically connected to the heater 314.

The second terminal 304 may be positioned at a position corresponding to the first terminal 164. When the cartridge 30 is inserted into the reception space 11, the second terminal 304 may come into contact with the first terminal 164, and may thus be electrically connected thereto. The first terminal 164 may transmit power to the second terminal 304 such that the heater 314 heats the wick 313.

In summary, referring to FIGS. 1 to 18, an aerosol-generating device according to an aspect of the present disclosure includes a housing 10, a cartridge 30 disposed in the housing and including a first container 31 and a second container 32 which are rotatably coupled, wherein the second container 32 includes a plurality of chambers 321, 322, . . . , which are isolated from each other, a dial gear 42 disposed in the housing 10 and configured to rotate about a rotating shaft parallel to the rotating shaft of the second container 32, and a cartridge gear 41 coupled to the second container 32 and engaged with the dial gear 42 such that rotation of the dial gear 42 causes rotation of the second container 32 via the cartridge gear 41.

In another aspect of the present disclosure, the cartridge gear 41 is coupled to the second container 32 via a projection 416 projecting from an inner facing surface of the cartridge gear 41 being engaged with a first guide groove 326 formed at an outer facing surface of the second container 32.

In another aspect of the present disclosure, the first guide groove 326 may be formed vertically along the outer facing surface of the second container 32 and includes a portion which is wider toward the lower end.

In another aspect of the present disclosure, the first container 31 may include a first guide groove 316 formed vertically along an outer facing surface of the first container 31 which is configured such that the first guide groove 316 and the second guide groove 326 are continuously aligned In another aspect of the present disclosure, the cartridge 30 is disposed within a reception space 11 of the housing 10 configured to accommodate the cartridge 30 therein, and wherein the inner facing surface of the cartridge gear 41 may correspond to a shape of a inner facing surface of the reception space 11, and may define a continuous space together with the reception space 11.

In another aspect of the present disclosure, the cartridge 30 may be configured such that one of a plurality of chambers 321, 322, . . . of the second container 32 is connectable to the first container 31 via a passage while another of the plurality of chambers 321, 322, . . . of the second container 32 is closed.

In another aspect of the present disclosure, the plurality of chambers 321, 322, . . . may be arranged around the rotating shaft of the second container 32.

In another aspect of the present disclosure, the aerosol-generating device may further include a dial 43 coupled to the dial gear 42 so as to be rotated therewith, wherein at least a portion of the dial 43 is externally exposed from the housing 10.

In another aspect of the present disclosure, the dial 43 may be configured to rotate coaxially with the dial gear 42.

In another aspect of the present disclosure, the outer facing surface of the dial 43 may include an concavo-convex portion 432 formed thereon.

In another aspect of the present disclosure, the concavo-convex portion 432 may have a height lower than the height of gear teeth 412 of the cartridge gear 41 and/or the height of gear teeth 422 of the dial gear 42.

In another aspect of the present disclosure, the dial 43 may be disposed at an upper portion of the housing 10.

In another aspect of the present disclosure, the aerosol-generating device may further include a holding groove 317 formed at the outer facing surface of the first container 31, and a holding protrusion 117 which projects into the reception space 11 and is configured to engage with the holding groove 317 to secure the first container 31.

In another aspect of the present disclosure, the aerosol-generating device may further include a fitting hole 307, disposed at the bottom of the first container 31, and a fitting protrusion 167 at the bottom of the reception space 11 and configured to be inserted into the fitting hole 307.

In another aspect of the present disclosure, the fitting hole 307 and the fitting protrusion 167 may be spaced apart from the axis extending from the rotating shaft of the second container 32.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An aerosol-generating device comprising:
    a housing;
    a cartridge disposed in the housing and including a first container and a second container which are rotatably coupled, wherein the second container includes a plurality of chambers which are isolated from each other;
    a dial gear disposed in the housing and configured to rotate about a rotating shaft parallel to a rotating shaft of the second container; and
    a cartridge gear coupled to the second container and engaged with the dial gear such that rotation of the dial gear causes rotation of the second container via the cartridge gear.

2. The aerosol-generating device according to claim 1, wherein the cartridge gear is coupled to the second container via a projection projecting from an inner facing surface of the cartridge gear being engaged with a first second guide groove formed at an outer facing surface of the second container.

3. The aerosol-generating device according to claim 2, wherein the second guide groove is formed vertically along the outer facing surface of the second container and includes a portion which is wider toward a lower end.

4. The aerosol-generating device according to claim 3, wherein the first container includes a first guide groove formed vertically along an outer facing surface of the first container which is configured such that the first guide groove and the second guide groove are continuously aligned.

5. The aerosol-generating device according to claim 1, wherein the cartridge is disposed within a reception space of the housing configured to accommodate the cartridge therein, and
    wherein an inner facing surface of the cartridge gear corresponds to a shape of a circumferential surface of the reception space, such that a continuous space is defined together by the inner facing surface of the cartridge gear and the reception space.

6. The aerosol-generating device according to claim 1, wherein the cartridge is configured such that one of the plurality of chambers of the second container is connectable to the first container via a passage while another of the plurality of chambers of the second container is closed.

7. The aerosol-generating device according to claim 1, wherein the plurality of chambers are arranged around the rotating shaft of the second container.

8. The aerosol-generating device according to claim 1, further comprising a dial coupled to the dial gear so as to be rotated therewith, wherein at least a portion of the dial is externally exposed from the housing.

9. The aerosol-generating device according to claim 8, wherein the dial is configured to rotate coaxially with the dial gear.

10. The aerosol-generating device according to claim 8, wherein an outer facing surface of the dial includes an concavo-convex portion formed thereon.

11. The aerosol-generating device according to claim 10, wherein the concavo-convex portion has a height lower than a height of gear teeth of the cartridge gear and a height of gear teeth of the dial gear.

12. The aerosol-generating device according to claim 8, wherein the dial is disposed at an upper portion of the housing.

13. The aerosol-generating device according to claim 1, wherein the cartridge is disposed within a reception space of the housing configured to accommodate the cartridge therein, and the aerosol-generating device further comprises:
    a holding groove formed at an outer facing surface of the first container; and
    a holding protrusion which projects into the reception space and is configured to engage with the holding groove to secure the first container.

14. The aerosol-generating device according to claim 1, wherein the cartridge is disposed within a reception space of the housing configured to accommodate the cartridge therein, and the aerosol-generating device further comprises:
    a fitting hole disposed at a bottom of the first container; and
    a fitting protrusion at a bottom of the reception space and configured to be inserted into the fitting hole.

15. The aerosol-generating device according to claim 14, wherein the fitting hole and the fitting protrusion are spaced apart from an axis extending from the rotating shaft of the second container.

* * * * *